(12) United States Patent  
Sauter et al.

(10) Patent No.: US 7,925,573 B2  
(45) Date of Patent: *Apr. 12, 2011

(54) COMPUTER PROGRAM PRODUCT FOR IMPLEMENTING INVESTMENT COMPANY THAT ISSUES A CLASS OF CONVENTIONAL SHARES AND A CLASS OF EXCHANGE-TRADED SHARES IN THE SAME FUND

(75) Inventors: George U. Sauter, Malvern, PA (US); Walter Lenhard, Wayne, PA (US)

(73) Assignee: The Vanguard Group, Inc., Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/781,203

(22) Filed: May 17, 2010

(65) Prior Publication Data

US 2010/0223202 A1 Sep. 2, 2010

Related U.S. Application Data

(63) Continuation of application No. 12/036,626, filed on Feb. 25, 2008, now Pat. No. 7,720,749, which is a continuation of application No. 11/093,183, filed on Mar. 28, 2005, now Pat. No. 7,337,138, which is a continuation of application No. 09/801,128, filed on Mar. 7, 2001, now Pat. No. 6,879,964.

(51) Int. Cl.  
*G06Q 40/00* (2006.01)

(52) U.S. Cl. .......................... 705/37; 705/35; 705/36 R

(58) Field of Classification Search .................... 705/35, 705/36 R, 37  
See application file for complete search history.

(56) References Cited

U.S. PATENT DOCUMENTS

| | | | |
|---|---|---|---|
| 5,262,942 A | 11/1993 | Earle | |
| 5,806,048 A | 9/1998 | Kiron et al. | |
| 5,946,667 A | 8/1999 | Tull, Jr. et al. | |
| 5,963,923 A | 10/1999 | Garber | |
| 5,983,204 A | 11/1999 | Debe | |
| 6,016,483 A | 1/2000 | Rickard et al. | |
| 6,088,685 A | 7/2000 | Kiron et al. | |
| 6,092,056 A | 7/2000 | Tull, Jr. et al. | |
| 6,125,355 A | 9/2000 | Bekaert et al. | |

(Continued)

FOREIGN PATENT DOCUMENTS

JP 001179374 A 7/1989

(Continued)

OTHER PUBLICATIONS

Damato, Karen, et al. "Critics Worry About Risks of Exchange-Traded Funds," Wall Street Journal (Eastern Edition). New York, NY: Jul. 7, 2000, p. C.1 (3 pages).

(Continued)

*Primary Examiner* — Lalita M Hamilton  
(74) *Attorney, Agent, or Firm* — Panitch Schwarze Belisario & Nadel LLP

(57) ABSTRACT

A computer program product is provided for administering a single investment company. The computer program product has a computer-readable medium encoded with computer-executable instructions. The instructions perform a method wherein the single investment company issuing one or more classes of shares that are bought from and redeemed with the single investment company at a net asset value and issues one or more classes of shares that are listed for trading on a securities exchange and that are bought and sold at negotiated market prices. One or more computers maintain account data of the outstanding shares. An owner of any share of any share class has an undivided interest in the single investment company.

12 Claims, 1 Drawing Sheet

U.S. PATENT DOCUMENTS 6,236,972 B1     5/2001     Shkedy
2001/0025266 A1     9/2001     Gastineau et al.

FOREIGN PATENT DOCUMENTS

WO            9606402 A1     2/1996

OTHER PUBLICATIONS

McDowell, Dagen. "Non-Index Exchange-Traded Funds on the Horizon," printout from web site: http://thestreet.com/funds/deardagen/940643.html, printout date: Jun. 13, 2001, 4 pages, date of article: May 16, 2000.

Novakoff, James L., Exchange Traded Funds: A White Paper, indexfunds.com, archives, Feb. 24, 2000, pp. 1-14.

Prospectus for Smith Barney Small Cap Growth Fund, dated Jan. 29, 2001, printout from web site: http://www.salomonsmithbarney.com/prod_svc/mut_fund . . . , printout date: Jun. 12, 2001, 16 pages.

Regnier, Pat, "The New Force in Funds," Money. New York: Feb. 2000, vol. 29, Issue 2, p. 126 (3 pages).

Tergesen, A. "New Exchange Funds: Not Just Spiders and WEBS," Businessweek Online, Nov. 15, 1999, 4 pages.

Third-party submission under 37 C.F.R. 1.99 in published application No. 2002/0128947, filed in U.S. Patent & Trademark Office on Jul. 10, 2003, 7 pages.

U.S. Trademark Registration for "SPDR" stating first use in commerce as Jan. 29, 1993, printout from USPTO TESS web site, printout date: Oct. 24, 2000, 2 pages.

Ward, S. "New Spiders, New Webs: Fund companies consider creating their own exchange-traded replicas." Barron's, Nov. 15, 1999, F3-F4, 2 pages.

"What You Should Know About ETF's," Trade Winds, vol. II, 2001, Vanguard Brokerage Services, The Vanguard Group, 8 pages.

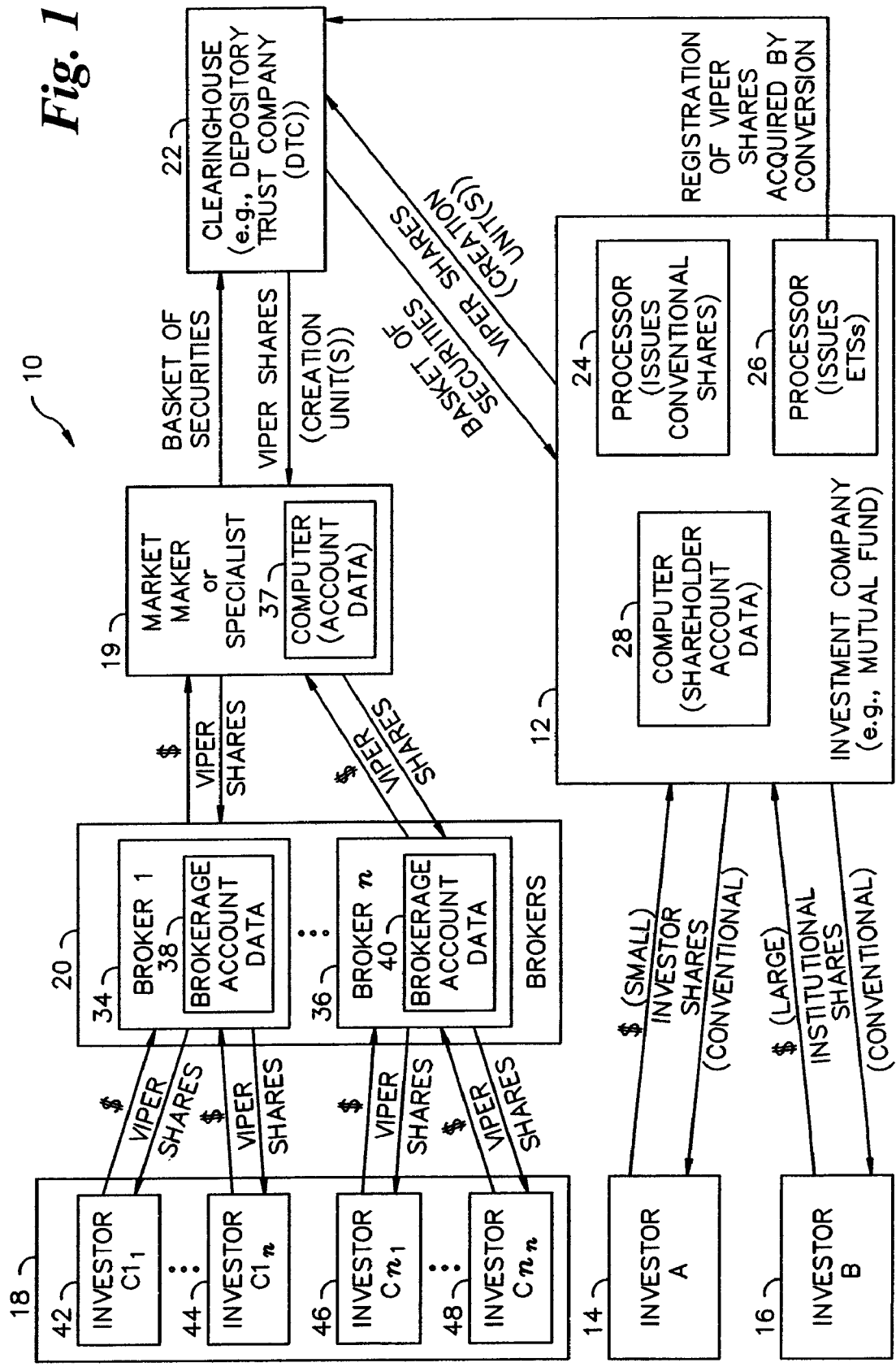

COMPUTER PROGRAM PRODUCT FOR IMPLEMENTING INVESTMENT COMPANY THAT ISSUES A CLASS OF CONVENTIONAL SHARES AND A CLASS OF EXCHANGE-TRADED SHARES IN THE SAME FUND

CROSS-REFERENCE TO RELATED APPLICATIONS

This application is a continuation of copending U.S. application Ser. No. 12/036,626 filed Feb. 25, 2008, which is a continuation of U.S. application Ser. No. 11/093,183 filed Mar. 28, 2005, now U.S. Pat. No. 7,337,138, which is a continuation of U.S. application Ser. No. 09/801,128 filed Mar. 7, 2001, now U.S. Pat. No. 6,879,964. The entire disclosures of each of these prior applications are incorporated herein by reference.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

Investment companies are corporations or trusts that are in the business of buying and selling securities. Such companies issue shares that are bought by investors. The value of an investment company's shares is measured by adding up the value of the securities it owns (and any other assets), subtracting liabilities, and dividing by the number of outstanding shares. This figure is known as the investment company's "net asset value" (NAV). It is typically calculated once per day, at the close of the financial markets.

There are three main types of investment companies: open-end funds, closed-end funds, and unit investment trusts (UITs). The shares issued by open-end funds and UITs are redeemable, i.e., they can be tendered back to the issuer in exchange for cash (or in rare cases securities) in an amount equal to the NAV of the shares tendered. Closed-end fund shares are not redeemable. To provide liquidity to an investment in a closed-end fund, the fund sponsor typically lists the shares for trading on a stock exchange. After the initial issuance of shares by a closed-end fund, the fund's shares are bought and sold over the exchange at market prices determined by supply and demand.

Investors who want to sell shares of a closed-end fund can do so at any time that the stock exchange is open at the then-current market price. The market price of a closed-end fund's shares differ from, and are often well below, the NAV of those shares. Shares of open-end funds and UIT's, by contrast, can be redeemed only at the NAV determined at the end of the day.

A hybrid investment company, commonly known as an "exchange-traded fund" (ETF), has recently arisen that seeks to provide investors with the best aspects of closed-end funds (intra-day liquidity) on the one hand and open-end funds and UITs (redeeming one's shares at or above NAV) on the other. ETF's are open-end funds or UIT's whose shares are listed for trading on a stock exchange. (The shares issued by ETFs are referred to herein as "ETSs," for "exchange-traded shares.")

Unlike the conventional shares issued by open-end funds or UIT's, ETSs have certain characteristics that more closely resemble common stock or the shares of closed-end funds:

(1) ETSs are listed for trading on a stock exchange;

(2) ETSs may be bought and sold at any time during the exchange's trading hours at prevailing market prices; and (2) The market price of ETSs fluctuates throughout the day based on supply and demand.

Although there is no requirement that they do so, ETSs issued to date track stock indices, such as the S&P 500 Index or the Nasdaq 100 Index. ETSs are particularly popular with short-term investors and traders, market timers, and speculators.

The current approach taken by an investment company sponsor that wants to offer ETSs is to create a new investment company for that purpose. The new investment company issues the ETSs. Shareholders are allowed to buy or sell the ETSs which are held in brokerage accounts.

Investment company sponsors that do not currently provide ETSs face competitive pressures to offer ETSs to their shareholders so as to retain the assets of the existing shareholders who prefer ETSs to conventional fund shares, and to attract the assets of new shareholders who may wish to trade ETSs as part of their portfolio. However, there are significant disadvantages to the current approach of creating a new investment company to offer ETSs to customers:

(1) Creation of a new investment company creates additional overhead costs for the sponsor.

(2) In the case of an index fund, a new investment company may not immediately attract a sufficient quantity of assets to accurately track its target index.

(3) Lack of cash purchases into an investment company, no matter what its size, impedes the ability of the company to track its target index and adjust the portfolio of securities.

Accordingly, there is an unmet need for a scheme that would allow investment company sponsors to offer ETSs without having to create new investment companies for this purpose. The present invention fulfills such a need.

BRIEF DESCRIPTION OF THE DRAWING

The foregoing summary as well as the following detailed description of preferred embodiments of the invention, will be better understood when read in conjunction with the appended drawing. For the purpose of illustrating the invention, there is shown in the drawing an embodiment that is presently preferred. It should be understood, however, that the invention is not limited to the precise arrangements and instrumentalities shown. In the drawing:

FIG. 1 shows a schematic block diagram of one preferred embodiment of the present invention.

BRIEF SUMMARY OF THE INVENTION

An investment company issues one or more classes of conventional shares that are bought from and redeemed with the company (either directly or through an intermediary) at NAV, and one or more classes of shares that are listed for trading on a national securities exchange and that are bought and sold at negotiated market prices. Account data for outstanding shares of all classes of shares are maintained in one or more computers. The investment company may be an open-end fund, a closed-end fund, or a UIT. The investment company could have an investment objective of tracking a specific target index of securities or the investment company could be actively managed by an investment advisor.

A shareholder can acquire ETSs of the investment company in one of three ways:

(1) by purchasing the ETSs in the secondary market through a broker, at the prevailing market price;

(2) by converting a designated number of conventional shares into ETSs issued by the same company with an equal NAV; or (3) if the purchaser is pre-approved as an "authorized participant," by acquiring a predetermined number of ETSs directly from the issuing fund in exchange for a specified or individually negotiated basket of securities (or securities and cash) with an equal NAV.

DETAILED DESCRIPTION OF THE INVENTION

Certain terminology is used herein for convenience only and is not to be taken as a limitation on the present invention. In the drawings, the same reference letters are employed for designating the same elements throughout the several figures.

The present invention provides a computer-implemented process of administering an investment company. The investment company offers multiple share classes, including at least one class of conventional shares and at least one class of ETSs. Thus, in contrast to the current approach of offering ETSs by creating a new investment company that offers only ETSs, the present invention permits a sponsor to offer ETSs as a separate share class of a multi-class fund. The present invention could be used by existing investment companies that offer only conventional shares to provide ETSs to investors. Alternatively, the present invention could be used by newly established investment companies to provide both conventional shares and ETSs to investors.

The investment company could be an open-end fund (e.g., open-end mutual fund), a closed-end fund (e.g., closed-end mutual fund), or a UIT. The ETSs issued by the investment company are publicly listed and traded on a national stock exchange, such as the American Stock Exchange (AMEX). The investment company could have an investment objective of tracking a specific target index of securities (i.e., an index fund). Alternatively, the investment company could be actively managed by an investment advisor in a manner that does not attempt to track a target index.

Creating a new ETS class of an investment company that also offers conventional shares provides the following benefits:

(1) The investment company sponsor will incur less overhead costs since it is cheaper to create an additional share class of an existing fund than to create a new fund.

(2) An investment company that offers more classes may attract more assets. All other things being equal, an investment company with more assets generally can track its target index more accurately.

(3) Redemptions from the exchange-traded class will be fulfilled in kind by selecting the lowest cost lots of each stock distributed. This process reduces the unrealized capital gains that currently exist in an existing fund, thereby benefiting existing shareholders.

(4) The intra-day trading feature of the ETS class will draw market timers out of the conventional shares, where they cause problems, into the ETSs, where they do not. Market timers cause problems because their frequent purchase and redemption requests cause a fund to buy and sell portfolio securities more often, which increases transaction costs (e.g., brokerage commissions) and administrative costs (e.g., processing the timer's trades, sending out confirmations). Additional costs lower the fund's performance and make it harder for the fund to track its target index. In addition, frequent portfolio transactions can increase the fund's realization of capital gains. The uncertainty of frequent cash flows makes it more difficult to keep the portfolio appropriately balanced. These problems do not occur when the market timers hold ETSs because a timer's frequent trading of ETSs is effected on the secondary market with other investors, and does not affect the fund's portfolio.

(5) The conversion feature allows market timers and other investors to move from the conventional share class to the ETS class without disrupting the fund's portfolio. If market timers had to redeem conventional shares of a fund to move to an ETS class of the same fund or to an exchange-traded fund with the same investment objective, the fund would have to sell portfolio securities, causing the problems described above. The conversion feature eliminates those problems. It permits market timers and other investors to move from one class of shares to another without incurring capital gains because, under Internal Revenue Service rules, exchanges between classes of the same fund are not taxable transactions.

In one preferred embodiment of the present invention, ETSs may be acquired in one of three different ways:

(1) If a shareholder owns conventional shares in the multi-class investment company, the shareholder may acquire ETSs by requesting conversion of a designated number or dollar value of conventional shares to a monetarily equivalent number of ETSs. The shareholder's account data is then updated to reflect the new number of conventional shares and ETSs.

(2) An investor may purchase ETSs directly from the investment company in exchange for a basket of securities of generally equivalent monetary value. Preferably, the direct purchase requires a purchase of a predetermined number of ETSs, known as a "Creation Unit." The account data is then updated to include the newly purchased shares. A "Creation Unit" will preferably cost millions of dollars, and thus, Creation Units will be purchased primarily by institutional investors who have been pre-approved.

(3) An investor may purchase ETSs on the secondary market through a broker. The account data of the investor is then updated to reflect the new number of shares held by the investor.

In one preferred embodiment of the present invention, ETSs may be sold or redeemed in one of two different ways:

(1) An investor may redeem ETSs directly with the mutual fund in exchange for a basket of securities of generally equivalent monetary value. Preferably, only Creation Units may be redeemed in this manner.

(2) A shareholder may sell ETSs directly on the secondary market through a broker.

In one preferred embodiment of the present invention, a conversion from ETSs to conventional shares will not be permitted.

The investment company of the present invention is less likely to suffer from the disruptive effects of short-term investors. As discussed above, short-term investors raise expenses by forcing an investment company to incur brokerage expenses and other transaction costs as portfolio securities are bought and sold to meet frequent purchase and redemption requests. They also increase the chance that the investment company might have to sell stock to raise cash to pay a redeeming shareholder, causing the fund to incur capital gains and decreasing the tax efficiency of the fund. They also make it more difficult to ensure that the portfolio is appropriately invested with the desired amount of cash on hand. The present invention may also make it possible for an investment company to track its target index more closely by reducing transaction costs, reducing the need for the fund to hold cash reserves to meet redemption requests, and spreading fixed costs over a larger asset base, thereby helping the investment company realize further economies of scale.

In addition to the benefits listed above, the present invention will have the added benefit of making available, in response to market demand, a security that provides a low-cost market basket product for investors that offers intra-day liquidity. Short-term investors are expected to prefer ETSs to conventional shares when selecting the class of shares that the investor wishes to hold in the investment company.

One example of a commercial implementation of the present invention is provided in Appendices A and B. In the example, selected funds of The Vanguard Group offer a conventional class of shares, and a class of ETSs referred to as the VIPER Share Class. VIPER is an acronym for Vanguard Index Participation Equity Receipts. VIPER shares are thus a class of exchange-traded securities that represent an interest in a portfolio of stocks held by a particular Vanguard index mutual fund.

Appendix A includes selected portions of a prospectus of a Registration Statement for VIPER shares. Appendix B includes selected portions of a Statement of Additional Information (SAI) of a Registration Statement for VIPER shares.

FIG. 1 shows a schematic block diagram of a system 10 in one preferred embodiment of the present invention. The system 10 coincides with the description of the investment company set forth in the Registration Statement.

The system 10 includes an investment company 12, investors A, B and C (labeled as 14, 16 and 18, respectively), a market maker or specialist 19, brokers 20 and a clearinghouse 22. The investment company 12 includes a first processor 24 that records one or more classes of conventional shares issued by the investment company 12, and a second processor 26 that records one or more classes of ETSs issued by the investment company 12. In the presently described embodiment, the first processor 24 records one class of conventional shares issued by the investment company 12, such as a class of conventional shares that has a relatively small minimum investment of $1,000 or $3,000 ("investor shares"). Alternatively, the class of conventional shares could have a relatively large minimum investment, such as $10 million ("institutional shares"). In the presently described embodiment, the second processor 26 records one class of ETSs issued by the investment company 12. However, the scope of the present invention includes embodiments wherein plural classes of ETSs are issued. The investment company 12 also includes a computer 28 for maintaining shareholder account data. For each shareholder of the investment company 12, the computer 28 maintains a record of the amount of conventional shares.

Investor A represents one or more investors who have purchased conventional investor shares in exchange for cash. Investor B represents one or more investors who have purchased conventional institutional shares.

Investors who wish to purchase VIPER shares in quantities smaller than a Creation Unit must purchase the shares on the secondary market through a broker. This process is represented by the investors C (labeled as 18), the brokers 20, the market maker or specialist 19, and the clearinghouse 22.

A market maker is a financial entity that maintains firm bid and offer prices in a given security by standing ready to buy or sell round lots at publicly quoted prices. On an exchange, a specialist is the member firm that makes a market in the stock and maintains the limit order book. In the present invention, the market maker or specialist 19 (hereafter, "the market maker 19") purchases VIPER shares in Creation Units from the investment company 12 which are settled through the clearinghouse. The market maker 19 has a computer 37 for tracking its account data. In the current financial industry, the clearinghouse 22 is the Depository Trust Company (DTC). The DTC is a national clearinghouse for the settlement of trades in corporate and municipal securities and performs securities custody-related services for its participating banks and broker-dealers. DTC is owned by members of the financial industry and by their representatives who are its users. The use of other clearinghouses is within the scope of the present invention.

If an investor C wants to purchase VIPER shares, the investor C places an order with its broker 20. The broker 20 then purchases the VIPER shares from the market maker 19 for the investor C. In this example, the brokers 20 are labeled as broker 34 (broker 1) and broker 36 (broker n). Each broker 34, 36 has a computer for tracking brokerage account data for its shareholders, labeled as elements 38 and 40, respectively. Each broker 34, 36 may have many investors. In this example, investor 42 (investor $C1_1$) and investor 44 (investor $C1_n$) have accounts with broker 34, and investor 46 (investor $Cn_1$) and investor 48 (investor $Cn_n$) have accounts with broker 36.

The clearinghouse 22 also tracks and records all VIPER shares that are issued as a result of a conversion of conventional shares to VIPER shares. Thus, the clearinghouse 22 has a record of all outstanding VIPER shares issued by the investment company 12. In one preferred embodiment of the present invention, a broker 20 executes the conversion through the same process described above for investors C. That is, the shareholder places the conversion request directly with a broker.

FIG. 1 shows only purchase transactions. Sell-type transactions are performed by a reverse of the purchase transactions with the exception noted above that a shareholder cannot convert a VIPER share into a conventional share.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

APPENDIX A

An Introduction to VIPER Shares

What are VIPER Shares?

Vanguard Index Participation Equity Receipts, or "VIPER" Shares, are a class of exchange-traded securities that represent an interest in a portfolio of stocks held by a particular Vanguard index mutual fund. Five funds, each of which seeks to track a different segment of the U.S. stock market (as represented by a benchmark index), offer a VIPER Share class:

| Fund | VIPER Shares | Seeks to Track |
| --- | --- | --- |
| Vanguard Total Stock Market Index Fund | Total Stock Market VIPERs | The overall stock market |
| Vanguard 500 Index Fund | VIPERs | Large-Cap stocks |
| Vanguard Small-Cap Index Fund | Small-Cap VIPERs | Small-Cap stocks |
| Vanguard Growth Index Fund | Growth VIPERs | Large-Cap growth stocks |
| Vanguard Value Index Fund | Value VIPERs | Large-Cap value stocks |

In addition to VIPER Shares, each of these funds offers one or more conventional classes of fund shares. This prospectus, however, relates only to VIPER Shares.

How are VIPER Shares different from conventional mutual fund shares?

Conventional mutual fund shares are bought from and redeemed with the issuing fund for cash at a net asset value typically calculated once a day. VIPER Shares, by contrast, can not be purchased directly from or redeemed directly with the issuing fund except by or through Authorized Participants (defined below), and then only for an in-kind basket of securities.

Unlike conventional mutual fund shares, an organized secondary market is expected to exist for VIPER Shares because VIPER Shares will be listed for trading on the American Stock Exchange (AMEX). Investors can purchase and sell VIPER Shares on the secondary market through a broker. Secondary market transactions occur not at net asset value, but at market prices that change throughout the day based on the supply of, and demand for, VIPER Shares.

Although the market price of VIPER Shares typically will approximate its NAV, there may be times when the market price and the NAV vary, so you may receive more or less than NAV when you sell your Shares on the secondary market. Also, it is possible that an active trading market may not develop or be maintained.

How do I buy and sell VIPER Shares?

Each fund issues and redeems VIPER Shares only in bundles of a specified number. These bundles are known as "Creation Units." To purchase or redeem a Creation Unit, you must be an Authorized Participant or you must do so through a broker that is an Authorized Participant. An Authorized Participant is a participant in the Depository Trust Company that has executed a Participant Agreement with the funds' Distributor. Vanguard will provide you with a list of Authorized Participants upon request. Because Creation Units likely will cost millions of dollars, and can be purchased only in exchange for a basket of securities (and generally not for cash), it is expected that only a limited number of institutional investors will purchase and redeem VIPER Shares directly with an issuing fund.

Investors who cannot afford to purchase a Creation Unit can acquire VIPER Shares in one of two ways. If you own Investor Shares of a fund that issues VIPER Shares, you can convert those shares into VIPER Shares of equivalent value. For more information about the conversion privilege, see "Conversions and Exchanges" under More on VIPER Shares. In addition, any investor may purchase VIPER Shares on the secondary market (i.e., not from the issuing fund) through a broker; VIPER Shares are listed on the AMEX and publicly traded. To acquire VIPER Shares through either means, you must have a brokerage account. For information about acquiring VIPER Shares through conversion of Investor Shares or through a secondary market purchase, please contact your broker. If you want to sell VIPER Shares, you must do so through your broker; VIPER Shares can not be converted back into Investor Shares.

*Note:* When you buy or sell VIPER Shares on the secondary market, your broker may charge you a commission. In addition, because secondary market transactions occur at market prices, you may pay more than net asset value when you buy VIPER Shares, and receive less than net asset value when you sell those shares.

Profile—VIPERs™

The following profile summarizes key features of VIPERs, an exchange-traded share class of Vanguard 500 Index Fund.

INVESTMENT OBJECTIVE

VIPERs seek to match the performance of a benchmark index that measures the investment return of large-capitalization stocks.

INVESTMENT STRATEGIES

Vanguard 500 Index Fund employs a passive management strategy designed to track the performance of the Standard & Poor's 500 Index, which is dominated by the stocks of large U.S. companies. The Fund attempts to replicate the target index by investing all or substantially all of its assets in the stocks that comprise the Index.

PRIMARY RISKS

- VIPERs' total return, like stock prices generally, will fluctuate within a wide range, so an investor could lose money over short or even long periods. Stock markets tend to move in cycles, with periods of rising prices and periods of falling prices.
- VIPERs are subject to *investment style risk*, which is the chance that returns from large-capitalization stocks will trail returns from other asset classes or the overall stock market. Large-cap stocks tend to go through cycles of doing better—or worse—than the stock market in general. These periods have, in the past, lasted for as long as several years.
- VIPERs will be listed for trading on the AMEX and can be sold in the secondary market at market prices. Although it is expected that the market price of a VIPER typically will approximate its NAV, there may be times when the market price and the NAV vary significantly. Thus, if you sell VIPERs on the secondary market, you may receive less than NAV.
- Although VIPERs will be listed for trading on the AMEX, it is possible that an active trading market may not develop or be maintained.
- Trading of VIPERs on the AMEX may be halted if AMEX officials deem such action appropriate, VIPERs are delisted from the AMEX, or the activation of marketwide "circuit breakers" halts stock trading generally.

PERFORMANCE/RISK INFORMATION

The bar chart and table below provide an indication of the risks of investing in VIPERs. Because calendar-year performance information for VIPERs is not yet available, the information presented in the bar chart and table reflects the performance of the Investor Shares of Vanguard 500 Index Fund. (Investor Shares are offered through a separate prospectus). Performance information for the Investor Shares would be substantially similar, since both share classes are invested in the same portfolio of securities; their returns differ only to the extent that the expenses of the two classes differ.

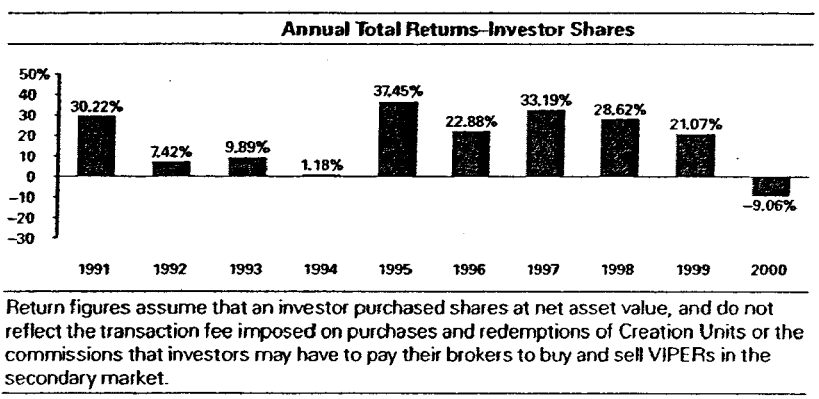

Annual Total Returns–Investor Shares

Return figures assume that an investor purchased shares at net asset value, and do not reflect the transaction fee imposed on purchases and redemptions of Creation Units or the commissions that investors may have to pay their brokers to buy and sell VIPERs in the secondary market.

During the period shown in the bar chart, the highest return for a calendar quarter was 21.39% (quarter ended December 31, 1998) and the lowest return for a quarter was −13.76% (quarter ended September 30, 1990).

Average Annual Total Returns (Investor Shares) for Years Ended December 31, 2000

|  | 1 Year | 5 Years | 10 Years |
|---|---|---|---|
| Vanguard 500 Index Fund | −9.06% | 18.31% | 17.35% |
| S&P 500 Index | −9.10 | 18.33 | 17.46 |

FEES AND EXPENSES

The following table describes the fees and expenses you may pay if you buy and hold VIPERs. The expenses shown under *Annual Operating Expenses* are based on estimated amounts for the current fiscal year. VIPERs have no operating history; actual operating expenses could be different.

Shareholder Fees *(fees paid directly from your investment)*

| | |
|---|---|
| Sales Charge (Load) Imposed on Purchases: | None |
| Sales Charge (Load) Imposed on Reinvested Dividends: | None |
| Transaction Fee on Purchases and Redemptions: | Varies* |
| Transaction Fee Imposed on Reinvested Dividends: | None |

Annual Operating Expenses *(expenses deducted from the Fund's assets)*

| | |
|---|---|
| Management Expenses: | 0.10% |
| 12b-1 Distribution Fee: | None |
| Other Expenses: | 0.02% |
| Total Annual Operating Expenses: | 0.12% |

*An investor purchasing or redeeming Creation Units of VIPERs will pay to the issuing fund a transaction fee of $•, plus an additional transaction fee of up to $• if the investor does not purchase or redeem through the Continuous Net Settlement System of the National Securities Clearing Corporation. An investor buying or selling VIPERs in the secondary market will pay a commission to his or her broker in an amount established by the broker.

The following example is intended to help retail investors compare the cost of investing in VIPERs with the cost of investing in other funds. It illustrates the hypothetical expenses that such investors would incur over various periods if they invest $10,000 in VIPERs. This example assumes that VIPERs provide a return of 5% a year, and that operating expenses remain the same. This example does not include the brokerage commissions that retail investors will pay to buy and sell VIPERs. It also does not include the transaction fee on purchases and redemptions of Creation Units, since this fee will not be imposed on retail investors.

| 1 Year | 3 Years | 5 Years | 10 Years |
|---|---|---|---|
| $12 | $39 | $68 | $154 |

The value of a VIPERs Creation Unit as of the date of this prospectus was approximately $•. Assuming an investment of $•, payment of the standard $• transaction fee to purchase and then to redeem the Creation Unit, a 5% return each year, and no change in operating expenses, the total cost of holding a VIPER Creation Unit would be $• if the Creation Unit is redeemed after one year and $• if redeemed after three years.

These examples should not be considered to represent actual expenses or performance from the past or for the future. Actual future expenses may be higher or lower than those shown.

Additional Information

Dividends and Capital Gains
Dividends are distributed quarterly in March, June, September, and December; capital gains, if any, are distributed annually in December

Investment Adviser
The Vanguard Group, Valley Forge, Pa., since inception

Inception Date
February 9, 2001

Number of VIPERs in a Creation Unit
60,000

Net Assets (all share classes) as of June 30, 2000
$105.6 billion

Vanguard Fund Number
968

Cusip Number
922908777

AMEX Trading Symbol
VV

Profile—Total Stock Market VIPERs™

The following profile summarizes key features of Total Stock Market VIPERs, and exchange-traded share class of Vanguard Total Stock Market Index Fund.

INVESTMENT OBJECTIVE

Total Stock Market VIPERs seek to match the performance of a benchmark index that measures the investment return of the overall stock market.

INVESTMENT STRATEGIES

Vanguard Total Stock Market Index Fund employs a passive management strategy designed to track the performance of the Wilshire 5000 Total Market Index, which consists of all the U.S. common stocks regularly traded on the New York and American Stock Exchanges and the Nasdaq over-the-counter market. The Fund invests all or substantially all of its assets in a representative sample of the stocks that comprise the Index.

PRIMARY RISKS

- Total Stock Market VIPERs' total return, like stock prices generally, will fluctuate within a wide range, so an investor could lose money over short or even long periods. Stock markets tend to move in cycles, with periods of rising prices and periods of falling prices.
- Total Stock Market VIPERs will be listed for trading on the AMEX and can be sold in the secondary market at market prices. Although it is expected that the market price of a Total Stock Market VIPER typically will approximate its NAV, there may be times when the market price and the NAV vary significantly. Thus, if you sell Total Stock Market VIPERs on the secondary market, you may receive less than NAV.
- Although Total Stock Market VIPERs will be listed for trading on the AMEX, it is possible that an active trading market may not develop or be maintained.
- Trading of Total Stock Market VIPERs on the AMEX may be halted if AMEX officials deem such action appropriate, Total Stock Market VIPERs are delisted from the AMEX, or the activation of marketwide "circuit breakers" halts stock trading generally.

PERFORMANCE/RISK INFORMATION

The bar chart and table below provide an indication of the risks of investing in Total Stock Market VIPERs. Because calendar-year performance information for Total Stock Market VIPERs is not yet available, the information presented in the bar chart and table reflects the performance of the Investor Shares of Vanguard Total Stock Market Index Fund. (Investor Shares are offered through a separate prospectus). Performance information for Total Stock Market VIPERs would be substantially similar, since both share classes are invested in the same portfolio of securities; their returns differ only to the extent that the expenses of the two classes differ.

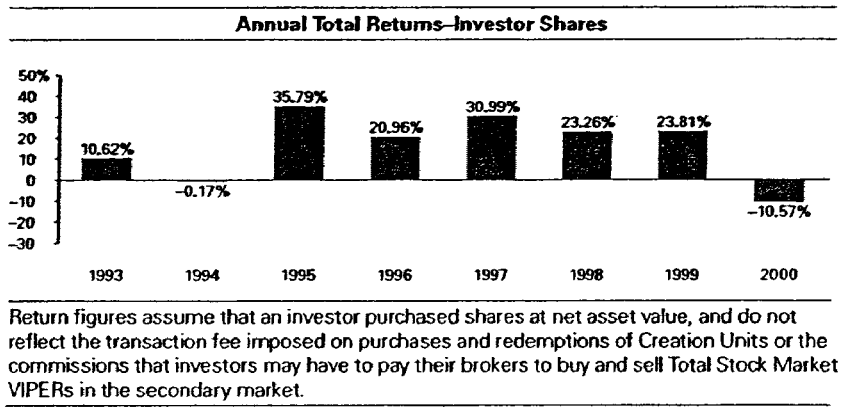

Annual Total Returns—Investor Shares

Return figures assume that an investor purchased shares at net asset value, and do not reflect the transaction fee imposed on purchases and redemptions of Creation Units or the commissions that investors may have to pay their brokers to buy and sell Total Stock Market VIPERs in the secondary market.

During the period shown in the bar chart, the highest return for a calendar quarter was 21.51% (quarter ended December 31, 1998) and the lowest return for a quarter was −12.07% (quarter ended September 30, 1998).

Average Annual Total Returns (Investor Shares) for Years Ended December 31, 2000

|  | 1 Year | 5 Years | Since Inception* |
|---|---|---|---|
| Vanguard Total Stock Market Index Fund | −10.57% | 16.68% | 15.83% |
| Wilshire 5000 Index | −10.99 | 16.66 | 16.01 |

*April 27, 1992.

FEES AND EXPENSES

The following table describes the fees and expenses you may pay if you buy and hold Total Stock Market VIPERs. The expenses shown under *Annual Operating Expenses* are based on estimated amounts for the current fiscal year. Total Stock Market VIPERs have no operating history; actual operating expenses could be different.

Shareholder Fees *(fees paid directly from your investment)*

| | |
|---|---|
| Sales Charge (Load) Imposed on Purchases: | None |
| Sales Charge (Load) Imposed on Reinvested Dividends: | None |
| Transaction Fee on Purchases and Redemptions: | Varies* |
| Transaction Fee Imposed on Reinvested Dividends: | None |

Annual Operating Expenses *(expenses deducted from the Fund's assets)*

| | |
|---|---|
| Management Expenses: | 0.13% |
| 12b-1 Distribution Fee: | None |
| Other Expenses: | 0.02% |
| Total Annual Operating Expenses: | 0.15% |

*An investor purchasing or redeeming Creation Units of Total Stock Market VIPERs will pay to the issuing fund a transaction fee of $•, plus an additional transaction fee of up to $• if the investor does not purchase or redeem through the Continuous Net Settlement System of the National Securities Clearing Corporation. An investor buying or selling Total Stock Market VIPERs in the secondary market will pay a commission to his or her broker in an amount established by the broker.

The following example is intended to help retail investors compare the cost of investing in Total Stock Market VIPERs with the cost of investing in other funds. It illustrates the hypothetical expenses that such investors would incur over various periods if they invest $10,000 in Total Stock Market VIPERs. This example assumes that Total Stock Market VIPERs provide a return of 5% a year, and that operating expenses remain the same. This example does not include the brokerage commissions that retail investors will pay to buy and sell Total Stock Market VIPERs. It also does not include the transaction fee on purchases and redemptions of Creation Units, since this fee will not be imposed on retail investors.

| 1 Year | 3 Years | 5 Years | 10 Years |
|--------|---------|---------|----------|
| $15    | $48     | $85     | $192     |

The value of a Total Stock Market VIPERs Creation Unit as of the date of this prospectus was approximately $•. Assuming an investment of $•, payment of the standard $• transaction fee to purchase and then to redeem the Creation Unit, a 5% return each year, and no change in operating expenses, the total cost of holding a Total Stock Market VIPER Creation Unit would be $• if the Creation Unit is redeemed after one year and $• if redeemed after three years.

These examples should not be considered to represent actual expenses or performance from the past or for the future. Actual future expenses may be higher or lower than those shown.

Additional Information

Dividends and Capital Gains
Dividends are distributed quarterly in March, June, September, and December; capital gains, if any, are distributed annually in December

Investment Adviser
The Vanguard Group, Valley Forge, Pa., since inception

Inception Date
February 9, 2001

Number of Total Stock Market VIPERs in a Creation Unit
60,000

Net Assets (all share classes) as of June 30, 2000
$24.3 billion

Vanguard Fund Number
970

Cusip Number
922908769

AMEX Trading Symbol
VTI

Profile—Small-Cap VIPERs™

The following profile summarizes key features of Small-Cap VIPERs, an exchange-traded share class of Vanguard Small-Cap Index Fund.

INVESTMENT OBJECTIVE

Small-Cap VIPERs seek to match the performance of a benchmark index that measures the investment return of the overall stock market.

INVESTMENT STRATEGIES

Vanguard Small-Cap Index Fund employs a passive management strategy designed to track the performance of the Russell 2000 Small Stock Index which is made up of the stocks of smaller U.S. companies. The Russell 2000 Index is comprised of the 2,000 smallest companies out of the 3,000 largest U.S. companies. The Fund invests all or substantially all of its assets in a representative sample of the stocks that comprise the Index.

PRIMARY RISKS

- Small-Cap VIPERs' total return, like stock prices generally, will fluctuate within a wide range, so an investor could lose money over short or even long periods. Stock markets tend to move in cycles, with periods of rising prices and periods of falling prices
- Small-Cap VIPERs are subject to *investment style risk*, which is the chance that returns from small-capitalization stocks will trail returns from other asset classes or the overall stock market. Small-cap stocks tend to go through cycles of doing better—or worse— than the stock market in general. These periods have, in the past, lasted for as long as several years.
- Small-Cap VIPERs will be listed for trading on the AMEX and can be sold in the secondary market at market prices. Although it is expected that the market price of a Small-Cap VIPER typically will approximate its NAV, there may be times when the market price and the NAV vary significantly. Thus, if you sell Small-Cap VIPERs on the secondary market, you may receive less than NAV.
- Although Small-Cap VIPERs will be listed for trading on the AMEX, it is possible that an active trading market may not develop or be maintained.
- Trading of Small-Cap VIPERs on the AMEX may be halted if AMEX officials deem such action appropriate, Small-Cap VIPERs are delisted from the AMEX, or the activation of marketwide "circuit breakers" halts stock trading generally.

PERFORMANCE/RISK INFORMATION

The bar chart and table below provide an indication of the risks of investing in Small-Cap VIPERs. Because calendar-year performance information for Small-Cap VIPERs is not yet available, the information presented in the bar chart and table reflects the performance of the Investor Shares of Vanguard Small-Cap Index Fund. (Investor Shares are offered through a separate prospectus). Performance information for the Small-Cap VIPERs would be substantially similar, since both share classes are invested in the same portfolio of securities; their returns differ only to the extent that the expenses of the two classes differ.

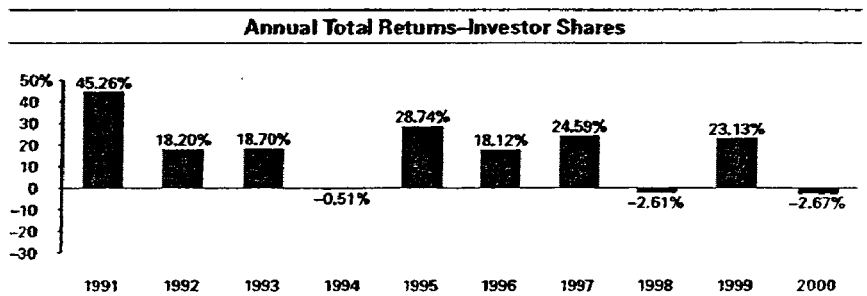

Annual Total Returns–Investor Shares

Return figures assume that an investor purchased shares at net asset value, and do not reflect the transaction fee imposed on purchases and redemptions of Creation Units or the commissions that investors may have to pay their brokers to buy and sell Small-Cap VIPERs in the secondary market.

During the period shown in the bar chart, the highest return for a calendar quarter was 29.29% (quarter ended March 31, 1991) and the lowest return for a quarter was –24.00% (quarter ended September 30, 1990).

| Average Annual Total Returns (Investor Shares) for Years Ended December 31, 2000 | | | |
|---|---|---|---|
| | 1 Year | 5 Years | 10 Years |
| Vanguard Small-Cap Index Fund | –2.67% | 11.43% | 16.19% |
| Russell 2000 Index | –3.03 | 10.31 | 15.53 |

FEES AND EXPENSES

The following table describes the fees and expenses you may pay if you buy and hold Small-Cap VIPERs. The expenses shown under *Annual Operating Expenses* are based on estimated amounts for the current fiscal year. Small-Cap VIPERs have no operating history; actual operating expenses could be different.

Shareholder Fees *(fees paid directly from your investment)*

| | |
|---|---|
| Sales Charge (Load) Imposed on Purchases: | None |
| Sales Charge (Load) Imposed on Reinvested Dividends: | None |
| Transaction Fee on Purchases and Redemptions: | Varies* |
| Transaction Fee Imposed on Reinvested Dividends: | None |

Annual Operating Expenses *(expenses deducted from the Fund's assets)*

| | |
|---|---|
| Management Expenses: | 0.16% |
| 12b-1 Distribution Fee: | None |
| Other Expenses: | 0.04% |
| Total Annual Operating Expenses: | 0.20% |

*An investor purchasing or redeeming Creation Units of Small-Cap VIPERs will pay to the issuing fund a transaction fee of $•, plus an additional transaction fee of up to $• if the investor does not purchase or redeem through the Continuous Net Settlement System of the National Securities Clearing Corporation. An investor buying or selling Small-Cap VIPERs in the secondary market will pay a commission to his or her broker in an amount established by the broker.

The following example is intended to help retail investors compare the cost of investing in Small-Cap VIPERs with the cost of investing in other funds. It illustrates the hypothetical expenses that such investors would incur over various periods if they invest $10,000 in Small-Cap VIPERs. This example assumes that Small-Cap VIPERs provide a return of 5% a year, and that operating expenses remain the same. This example does not include the brokerage commissions that retail investors will pay to buy and sell Small-Cap VIPERs. It also does not include the transaction fee on purchases and redemptions of Creation Units, since this fee will not be imposed on retail investors.

| 1 Year | 3 Years | 5 Years | 10 Years |
|--------|---------|---------|----------|
| $20    | $64     | $113    | $255     |

The value of a Small-Cap VIPERs Creation Unit as of the date of this prospectus was approximately $•. Assuming an investment of $•, payment of the standard $• transaction fee to purchase and then to redeem the Creation Unit, a 5% return each year, and no change in operating expenses, the total cost of holding a Small-Cap VIPER Creation Unit would be $• if the Creation Unit is redeemed after one year and $• if redeemed after three years.

These examples should not be considered to represent actual expenses or performance from the past or for the future. Actual future expenses may be higher or lower than those shown.

Additional Information

Dividends and Capital Gains
Distributed annually in December

Investment Adviser
The Vanguard Group, Valley Forge, Pa.,
since inception

Inception Date
February 9, 2001

Number of Small-Cap VIPERs in a Creation Unit
30,000

Net Assets (all share classes) as of June 30, 2000
$4.6 billion

Vanguard Fund Number
969

Cusip Number
922908751

AMEX Trading Symbol
VRY

Profile—Value VIPERs™

The following profile summarizes key features of Value VIPERs, an exchange-traded share class of Vanguard Value Index Fund.

INVESTMENT OBJECTIVE
Value VIPERs seek to match the performance of a benchmark index that measures the investment return of large-capitalization value stocks.

INVESTMENT STRATEGIES
Vanguard Value Index Fund employs a passive management strategy designed to track the performance of the Standard & Poor's 500/BARRA Value Index, which includes those stocks of the S&P 500 Index with lower-than-average price/book ratios. The Fund attempts to replicate the target index by investing all or substantially all of its assets in the stocks that comprise the Index.

PRIMARY RISKS
- Value VIPERs' total return, like stock prices generally, will fluctuate within a wide range, so an investor could lose money over short or even long periods. Stock markets tend to move in cycles, with periods of rising prices and periods of falling prices.
- Value VIPERs are subject to *investment style risk*, which is the chance that returns from large-capitalization value stocks will trail returns from other asset classes or the overall stock market. Value stocks tend to go through cycles of doing better—or worse—than the stock market in general. These periods have, in the past, lasted for as long as several years.
- Value VIPERs will be listed for trading on the AMEX and can be sold in the secondary market at market prices. Although it is expected that the market price of a Value VIPER typically will approximate its NAV, there may be times when the market price and the NAV vary significantly. Thus, if you sell Value VIPERs on the secondary market, you may receive less than NAV.
- Although Value VIPERs will be listed for trading on the AMEX, it is possible that an active trading market may not develop or be maintained.
- Trading of Value VIPERs on the AMEX may be halted if AMEX officials deem such action appropriate, Value VIPERs are delisted from the AMEX, or the activation of marketwide "circuit breakers" halts stock trading generally.

PERFORMANCE/RISK INFORMATION
The bar chart and table below provide an indication of the risks of investing in Value VIPERs. Because calendar-year performance information for Value VIPERs is not yet available, the information presented in the bar chart and table reflects the performance of the Investor Shares of Vanguard Value Index Fund. (Investor Shares are offered through a separate prospectus). Performance information for the Value VIPERs would be substantially similar, since both share classes are invested in the same portfolio of securities; their returns differ only to the extent that the expenses of the two classes differ.

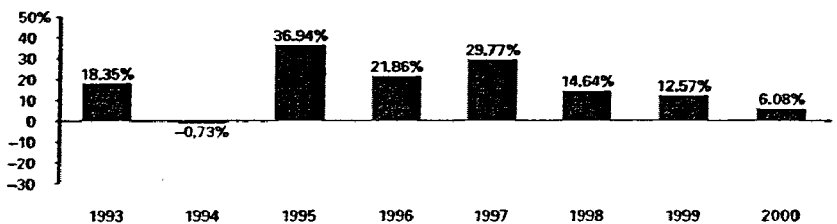

Return figures assume that an investor purchased shares at net asset value, and do not reflect the transaction fee imposed on purchases and redemptions of Creation Units or the commissions that investors may have to pay their brokers to buy and sell Value VIPERs in the secondary market.

During the period shown in the bar chart, the highest return for a calendar quarter was 17.50% (quarter ended December 31, 1998) and the lowest return for a quarter was −12.96% (quarter ended September 30, 1998).

Average Annual Total Returns (Investor Shares) for Years Ended December 31, 2000

|  | 1 Year | 5 Years | Since Inception* |
|---|---|---|---|
| Vanguard Value Index Fund** | 6.08% | 16.70% | 17.04% |
| S&P 500/BARRA Value Index | 6.08 | 16.81 | 17.17 |

*November 2, 1992.

FEES AND EXPENSES

The following table describes the fees and expenses you may pay if you buy and hold Value VIPERs. The expenses shown under Annual Operating Expenses are based on estimated amounts for the current fiscal year. Value VIPERs have no operating history; actual operating expenses could be different.

Shareholder Fees *(fees paid directly from your investment)*

| | |
|---|---|
| Sales Charge (Load) Imposed on Purchases: | None |
| Sales Charge (Load) Imposed on Reinvested Dividends: | None |
| Transaction Fee on Purchases and Redemptions: | Varies* |
| Transaction Fee Imposed on Reinvested Dividends: | None |

Annual Operating Expenses *(expenses deducted from the Fund's assets)*

| | |
|---|---|
| Management Expenses: | 0.14% |
| 12b-1 Distribution Fee: | None |
| Other Expenses: | 0.03% |
| Total Annual Operating Expenses: | 0.17% |

*An investor purchasing or redeeming Creation Units of Value VIPERs will pay to the issuing fund a transaction fee of $•, plus an additional transaction fee of up to $• if the investor does not purchase or redeem through the Continuous Net Settlement System of the National Securities Clearing Corporation. An investor buying or selling Value VIPERs in the secondary market will pay a commission to his or her broker in an amount established by the broker.

The following example is intended to help retail investors compare the cost of investing in Value VIPERs with the cost of investing in other funds. It illustrates the hypothetical expenses that such investors would incur over various periods if they invest $10,000 in Value VIPERs. This example assumes that Value VIPERs provide a return of 5% a year, and that operating expenses remain the same. This example does not include the brokerage commissions that retail investors will pay to buy and sell Value VIPERs. It also does not include the transaction fee on purchases and redemptions of Creation Units, since this fee will not be imposed on retail investors.

| 1 Year | 3 Years | 5 Years | 10 Years |
|--------|---------|---------|----------|
| $17    | $55     | $96     | $217     |

The value of a Value VIPERs Creation Unit as of the date of this prospectus was approximately $•. Assuming an investment of $•, payment of the standard $• transaction fee to purchase and then to redeem the Creation Unit, a 5% return each year, and no change in operating expenses, the total cost of holding a Value VIPER Creation Unit would be $• if the Creation Unit is redeemed after one year and $• if redeemed after three years.

These examples should not be considered to represent actual expenses or performance from the past or for the future. Actual future expenses may be higher or lower than those shown.

Additional Information

Dividends and Capital Gains
Dividends are distributed quarterly in March, June, September, and December; capital gains, if any, are distributed annually in December

Investment Adviser
The Vanguard Group, Valley Forge, Pa., since inception

Inception Date
February 9, 2001

Number of Value VIPERs in a Creation Unit
30,000

Net Assets (all share classes) as of June 30, 2000
$4.0 billion

Vanguard Fund Number
966

Cusip Number
922908744

AMEX Trading Symbol
VLP

Profile—Growth VIPERs™

The following profile summarizes key features of Growth VIPERs, an exchange-traded share class of Vanguard Growth Index Fund.

INVESTMENT OBJECTIVE

Growth VIPERs seeks to match the performance of a benchmark index that measures the investment return of large-capitalization growth stocks.

INVESTMENT STRATEGIES

Vanguard Growth Index Fund employs a passive management strategy designed to track the performance of the Standard & Poor's 500/BARRA Growth Index, which includes those stocks of the S&P 500 Index with higher-than-average price/book ratios. The Fund attempts to replicate the target index by investing all or substantially all of its assets in the stocks that comprise the Index.

PRIMARY RISK

- Growth VIPERs' total return, like stock prices generally, will fluctuate within a wide range, so an investor could lose money over short or even long periods. Stock markets tend to move in cycles, with periods of rising prices and periods of falling prices.
- Growth VIPERs are subject to *investment style risk*, which is the chance that returns from large-capitalization growth stocks will trail returns from other asset classes or the overall stock market. Growth stocks tend to go through cycles of doing better—or worse—than the stock market in general. These periods have, in the past, lasted for as long as several years.
- Growth VIPERs will be listed for trading on the AMEX and can be sold in the secondary market at market prices. Although it is expected that the market price of a Growth VIPER typically will approximate its NAV, there may be times when the market price and the NAV vary significantly. Thus, if you sell Growth VIPERs on the secondary market, you may receive less than NAV.
- Although Growth VIPERs will be listed for trading on the AMEX, it is possible that an active trading market may not develop or be maintained.
- Trading of Growth VIPERs on the AMEX may be halted if AMEX officials deem such action appropriate, Growth VIPERs are delisted from the AMEX, or the activation of marketwide "circuit breakers" halts stock trading generally.

PERFORMANCE/RISK INFORMATION

The bar chart and table below provide an indication of the risks of investing in Growth VIPERs. Because calendar-year performance information for Growth VIPERs is not yet available, the information presented in the bar chart and table reflects the performance of the Investor Shares of Vanguard Growth Index Fund. (Investor Shares are offered through a separate prospectus). Performance information for the Growth VIPERs would be substantially similar, since both share classes are invested in the same portfolio of securities; their returns differ only to the extent that the expenses of the two classes differ.

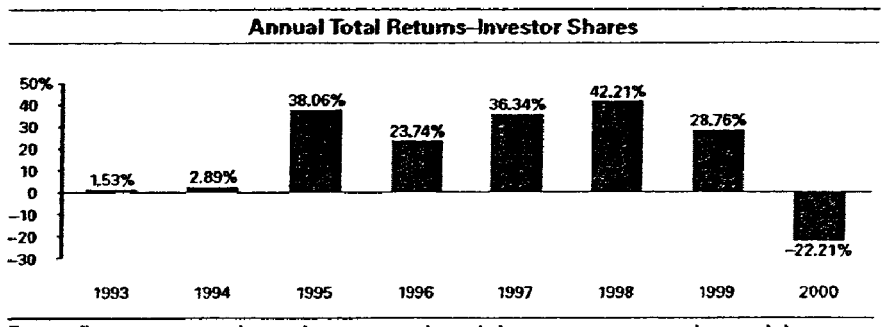

Annual Total Returns–Investor Shares

1993: 1.53%
1994: 2.89%
1995: 38.06%
1996: 23.74%
1997: 36.34%
1998: 42.21%
1999: 28.76%
2000: −22.21%

Return figures assume that an investor purchased shares at net asset value, and do not reflect the transaction fee imposed on purchases and redemptions of Creation Units or the commissions that investors may have to pay their brokers to buy and sell Growth VIPERs in the secondary market.

During the period shown in the bar chart, the highest return for a calendar quarter was 24.64% (quarter ended December 31, 1998) and the lowest return for a quarter was −16.88% (quarter ended December 31, 2000).

Average Annual Total Returns (Investor Shares) for Years Ended December 31, 2000

|  | 1 Year | 5 Years | Since Inception* |
|---|---|---|---|
| Vanguard Growth Index Fund | −22.21% | 19.17% | 16.90% |
| S&P 500/BARRA Growth Index | −22.08 | 19.18 | 17.01 |

*November 2, 1992.

FEES AND EXPENSES

The following table describes the fees and expenses you may pay if you buy and hold Value VIPERs. The expenses shown under *Annual Operating Expenses* are based on estimated amounts for the current fiscal year. Growth VIPERs have no operating history; actual operating expenses could be different.

Shareholder Fees *(fees paid directly from your investment)*

| | |
|---|---|
| Sales Charge (Load) Imposed on Purchases: | None |
| Sales Charge (Load) Imposed on Reinvested Dividends: | None |
| Transaction Fee on Purchases and Redemptions: | Varies* |
| Transaction Fee Imposed on Reinvested Dividends: | None |

Annual Operating Expenses *(expenses deducted from the Fund's assets)*

| | |
|---|---|
| Management Expenses: | 0.14% |
| 12b-1 Distribution Fee: | None |
| Other Expenses: | 0.03% |
| Total Annual Operating Expenses: | 0.17% |

*An investor purchasing or redeeming Creation Units of Growth VIPERs will pay to the issuing fund a transaction fee of $•, plus an additional transaction fee of up to $• if the investor does not purchase or redeem through the Continuous Net Settlement System of the National Securities Clearing Corporation. An investor buying or selling Growth VIPERs in the secondary market will pay a commission to his or her broker in an amount established by the broker.

The following example is intended to help retail investors compare the cost of investing in Growth VIPERs with the cost of investing in other funds. It illustrates the hypothetical expenses that such investor would incur over various periods if they invest $10,000 in Growth VIPERs. This example assumes that Growth VIPERs provide a return of 5% a year, and that operating expenses remain the same. The results apply whether or not you redeem your investment at the end of each period. This example does not include the brokerage commissions that retail investors will pay to buy and sell Growth VIPERs. It also does not include the transaction fee on purchases and redemptions of Creation Units, since this fee will not be imposed on retail investors.

| 1 Year | 3 Years | 5 Years | 10 Years |
|--------|---------|---------|----------|
| $17    | $55     | $96     | $217     |

The value of a Growth VIPERs Creation Unit as of the date of this prospectus was approximately $•. Assuming an investment of $•, payment of the standard $• transaction fee to purchase and then to redeem the Creation Unit, a 5% return each year, and no change in operating expenses, the total cost of holding a Growth VIPER Creation Unit would be $• if the Creation Unit is redeemed after one year and $• if redeemed after three years.

These examples should not be considered to represent actual expenses or performance from the past or for the future. Actual future expenses may be higher or lower than those shown.

Additional Information

Dividends and Capital Gains
Dividends are distributed quarterly in March, June, September, and December; capital gains, if any, are distributed annually in December

Investment Adviser
The Vanguard Group, Valley Forge, Pa., since inception

Inception Date
February 9, 2001

Number of Growth VIPERs in a Creation Unit
30,000

Net Assets (all share classes) as of June 30, 2000
$17.2 billion

Vanguard Fund Number
967

Cusip Number
922908736

AMEX Trading Symbol
VB

More on VIPER Shares

The following sections discuss other important features of VIPERs, Total Stock Market VIPERs, Small-Cap VIPERs, Value VIPERs, and Growth VIPERs.

INDEXING METHODS

In seeking to track a particular index, a fund generally uses one of two methods to select stocks.

Some index funds hold *each* stock found in their target indexes in about the same proportions as represented in the indexes themselves. This is called a "replication" method. For example, if 5% of the S&P 500 Index were made up of the stock of a specific company, a fund tracking that index would invest about 5% of *its* assets in that company. *The 500, Value, and Growth Index Funds employ the replication method of indexing.*

Because it would be very expensive to buy and sell *all* of the stocks held in certain indexes (the Wilshire 5000 Index, for example, included more than 6,800 stocks as of June 30, 2000), many funds tracking these larger indexes use a "sampling" technique. At Vanguard, we use a sophisticated computer program to select a representative sample of stocks from a fund's target index that will resemble the full index in terms of industry weightings, market capitalization, price/earnings ratio, dividend yield, and other characteristics. For instance, if 10% of the Wilshire 5000 Index were made up of utility stocks, a fund tracking that index would invest about 10% of its assets in some—but not all—of those utility stocks. The particular utility stocks selected by the fund, as a group, would have investment characteristics similar to those of the utility stocks in the Index. *The Total Stock Market and Small-Cap Index Funds employ the sampling method of indexing.*

The following table shows the number of stocks held by each of the issuing funds, and the number of stocks in each fund's target index, as of June 30, 2000.

| Fund | Number of Stocks Held | Number of Stocks in Target Index |
|---|---|---|
| Total Stock Market | 3,440 | 6,875 |
| 500 Index | 516 | 500 |
| Small-Cap | 2,029 | 2,000 |
| Value | 401 | 391 |
| Growth | 120 | 109 |

ADDITIONAL RISK INFORMATION

🚩 VIPER Shares are subject to market risk, which is the chance that stock prices overall will decline over short or even long periods. Stock markets tend to move in cycles, with periods of rising stock prices and periods of falling stock prices.

To illustrate the volatility of stock prices, the following table shows the best, worst, and average total returns for the U.S. stock market over various periods as measured by the S&P 500 Index, which—in addition to being the target index for Vanguard 500 Index Fund—is a widely used barometer of stock market activity. (Total returns consist of dividend income plus change in market price.) Note that the returns shown do not include the costs of buying and selling stocks or other expenses that a real-world investment portfolio would incur. Note, also, that the gap between best and worst tends to narrow over the long term.

| U.S. Stock Market Returns (1926–2000) | | | | |
|---|---|---|---|---|
| | 1 Year | 5 Years | 10 Years | 20 Years |
| Best | 54.2% | 28.6% | 19.9% | 17.8% |
| Worst | −43.1 | −12.4 | −0.8 | 3.1 |
| Average | 12.9 | 11.1 | 11.2 | 11.2 |

The table covers all of the 1-, 5-, 10-, and 20-year periods from 1926 through 2000. You can see, for example, that while the average return on common stocks for *all* of the 5-year periods was 11.1%, returns for *individual* 5-year periods ranged from a −12.4% average (from 1928 through 1932) to 28.6% (from 1995 through 1999). These average returns reflect *past* performance on common stocks; you should not regard them as an indication of *future* returns from either the stock market as a whole or any VIPER Shares in particular.

▌ VIPER shares are also subject, in varying degrees, to investment style risk, which is the chance that returns from a specific type of stock (for instance, small-cap or value) will trail returns from other asset classes or the overall stock market. Each type of stock tends to go through cycles of doing better—or worse—than common stocks in general. These periods have, in the past, lasted for as long as several years.

RISK OF NONDIVERSIFICATION

▌ As index funds, each of the U.S. Stock Index Funds holds the largest stocks in its target index in approximately the same percentages as those stocks are represented in its index. When a target index becomes less diversified, a fund that tracks that index similarly becomes less diversified. This has happened to the Growth Index Fund. Due to the rapid appreciation of certain stocks in its target index, the Fund's top four holdings, as of June 30, 2000, represent more than 26% of its total assets. By tracking its target index, the Fund technically has become "nondiversified" under SEC standards, although it continues to hold more than 100 stock positions in a variety of market sectors. As the market values of the Fund's largest holdings rise and fall, there may be times when the Fund is diversified under SEC standards and other times when it is not. *Holders of Growth VIPERs are subject to the risk that the Fund's performance could be hurt disproportionately by a decline in the price of just a few stocks.*

In the unlikely event that the target index of any of the other Vanguard U.S. Stock Index Funds becomes dominated by just a few companies, holders of VIPER Shares issued by those Funds would similarly be subject to the risk of nondiversification.

SPECIAL RISKS OF EXCHANGE-TRADED SHARES

▌ VIPER Shares are not individually redeemable. They can be redeemed with the Fund at net asset value only in large blocks known as Creation Units. You may incur brokerage costs in purchasing enough VIPER Shares to constitute a Creation Unit.

The market price of VIPER Shares may differ from net asset value. Individual VIPER Shares will be listed for trading on the AMEX and can be bought and sold in the secondary market at market prices. Although it is expected that the market price of a VIPER Share typically will approximate its net asset value (NAV), there may be times when the market price and the NAV vary significantly. Thus, you may pay more than NAV when buying VIPER Shares on the secondary market, and you may receive less than NAV when you sell those shares.

The market price of VIPER Shares, like the price of any exchange-traded security, includes a "bid-offered spread" charged by the exchange specialist and other market makers that cover the particular security. In times of severe market disruption, the bid-offered spread often increases significantly. This means that VIPER Shares are most likely to be traded at a discount to NAV, and the discount is likely to be greatest, when the price of VIPER Shares is falling fastest—and this may be the time that you most want to sell VIPER Shares.

Absence of Active Trading Market. Although VIPER Shares will be listed on the AMEX, it is possible that an active trading market may not develop. If an active trading market develops, there can be no guarantee that it will continue.

Trading Halts. Trading of VIPER Shares on the AMEX will be halted whenever trading in equity securities generally is halted by the activation of marketwide "circuit breakers," which are tied to large decreases in the Dow Jones Industrial Average. Trading of VIPER Shares also would be halted if (i) VIPER Shares are delisted from the AMEX without first being listed on another exchange, or (ii) AMEX officials determine that such action is appropriate in the interest of a fair and orderly market or to protect investors.

Note: If trading of VIPER Shares on the AMEX is halted, qualified investors (see below) will still be able to purchase Creation Units of VIPER Shares directly from an issuing fund or redeem such units with the fund.

PURCHASING VIPER SHARES FROM AN ISSUING FUND

You can purchase VIPER Shares from an issuing fund if you meet the following criteria and comply with the following procedures.

■ *Eligible Investors.* To purchase VIPER Shares from an issuing fund, you must be an Authorized Participant or you must purchase through a broker that is an Authorized Participant. An Authorized Participant is a participant in the Depository Trust Company that has executed a Participant Agreement with the Fund's Distributor (typically a brokerage firm).

- *Creation Units.* You must purchase VIPER Shares in large blocks, known as "Creation Units." The number of VIPER Shares that comprise a Creation Unit, and the minimum number of Creation Units you must purchase, are as follows:

| Fund | Number of Shares in a Unit | Minimum Purchase |
| --- | --- | --- |
| Vanguard 500 Index Fund | 60,000 | 1 unit |
| Vanguard Total Stock Market Index Fund | 60,000 | 1 unit |
| Vanguard Small-Cap Index Fund | 30,000 | 1 unit |
| Vanguard Value Index Fund | 30,000 | 1 unit |
| Vanguard Growth Index Fund | 30,000 | 1 unit |

For any particular fund, the number of VIPER Shares in a Creation Unit will not change, except in the event of a stock split or similar revaluation. The Funds will not issue fractional Creation Units.

- *In-kind Deposits.* To purchase VIPER Shares directly from an issuing fund, you must deposit with the fund a basket of securities. Each business day, prior to the opening of trading on the AMEX, the fund's adviser will make available, on the NSCC bulletin board, a list of the names and number of shares of each security to be included in that day's creation basket. Note: Each fund reserves the right to accept a non-conforming creation basket.
- *Balancing Amount.* In addition to the in-kind deposit of securities, you will either pay to, or receive from, the issuing fund a specified amount of cash (the Balancing Amount). This amount is designed to ensure that the NAV of your in-kind deposit is identical to the NAV of the Creation Unit it is used to purchase. The Balancing Amount is equal to the difference between the NAV of a Creation Unit and the value of the securities in the creation basket. The fund's adviser will publish, on a daily basis, information about the previous day's Balancing Amount. You also must pay a Transaction Fee, described below, in cash. The Balancing Amount and the Transaction Fee, taken together are referred to as the "Cash Component."
- *Placement of Purchase Orders.* All purchase orders must be placed with Vanguard by or through an Authorized Participant. Purchase orders will be processed either through a manual clearing process run by the DTC or through an enhanced clearing process that is available only to those DTC participants that also are participants in the Continuous Net Settlement System of the National Securities Clearing Corporation (NSCC). Authorized Participants that do not use the NSCC's enhanced clearing process will be charged a higher Transaction Fee (discussed below). A purchase order must be received by the Fund's Distributor prior to the close of regular trading on the New York Stock Exchange (ordinarily 4:00 pm New York time) on the day the order is placed, and all other procedures set forth in the Participant Agreement must be followed, in order for you to receive the NAV determined on that day.
- *Transaction Fee on Purchases of Creation Units.* A fixed Transaction Fee of $• is applicable to each creation transaction, regardless of the number of Creation Units purchased. An additional fee of up to $• (for a total of $•) is imposed on transactions effected through the DTC clearing process described above. Investors that elect to substitute cash in lieu of one or more deposit securities are subject to an additional charge determined at the discretion of the Fund. The Transaction Fee is paid to the fund, not to Vanguard or other third party. It protects existing shareholders of the fund from the costs associated with the purchase of Creation Units.

REDEEMING VIPER SHARES WITH AN ISSUING FUND

The redemption process is essentially the reverse of the purchase process.
- *Eligible Investors.* To redeem VIPER Shares with an issuing fund, you must be an Authorized Participant or you must redeem through a broker that is an Authorized Participant.
- *Creation Units.* To redeem VIPER Shares with an issuing fund, you must tender the shares in Creation Unit-size blocks.
- *In-kind Redemption Proceeds.* Redemption proceeds will be paid in-kind with a basket of securities. In most cases, the basket of securities you receive will be the same as that required of investors purchasing Creation Units on the same day. There will be times, however, when the creation and redemption baskets differ. The composition of the redemption basket will be available on the NSCC bulletin board. Note: Each fund reserves the right to honor a redemption request with a non-conforming redemption basket, with the consent of the redeeming investor.
- *Balancing Amount.* Depending on whether the NAV of a Creation Unit is higher or lower than the value of the redemption securities, you will either receive from or pay to the issuing fund a Balancing Amount in cash. If you are receiving a Balancing Amount, the amount due will be reduced by the amount of the applicable Transaction Fee.
- *Placement of Redemption Orders.* As with purchases, redemptions may be processed either through the DTC process or the enhanced NSCC process. A redemption order is deemed received on the date of transmittal if it is received by Vanguard prior to the close of regular trading on the New York Stock Exchange on that date, and all other procedures set forth in the Participation Agreement are followed.
- *Transaction Fee on Redemption of Creation Units.* A fixed Transaction Fee of $• is applicable to each redemption transaction, regardless of the number of Creation Units redeemed. An additional fee of up to $• (for a total of $•) may be imposed on transactions effected through the DTC clearing process. Investors that elect to receive cash in lieu of one or more securities in the redemption basket are subject to an additional charge determined at the discretion of the Fund. The Transaction Fee is paid to the fund, not to Vanguard or other third party. It protects existing shareholders of the fund from the costs associated with the redemption of Creation Units.

PURCHASING AND SELLING VIPER SHARES ON THE SECONDARY MARKET

You can buy and sell VIPER Shares on the secondary market in the same way you buy and sell any other exchange-traded security—through a broker. In most cases, the broker will charge you a commission to execute the transaction. The price at which you buy or sell VIPER Shares, *i.e.*, the market price, may be more or less than the net asset value of the shares. Unless imposed by your broker, there is no minimum dollar amount you must invest and no minimum number of VIPER Shares you must buy.

CONVERSIONS AND EXCHANGES

Conversions. Owners of conventional shares issued by one of the Vanguard Index Funds may convert those shares into VIPER Shares of equivalent value of the same Fund. *Note: Investors who own conventional shares of a Vanguard fund through a 401(k) plan or other employer-sponsored retirement or benefit plan may not convert those shares into VIPER Shares.* Vanguard will impose a charge on conversion transactions and reserves the right, in the future, to limit or terminate the conversion privilege. VIPER Shares, whether acquired through a conversion or purchased in the secondary market, cannot be converted into shares of another class of the same Fund.

Unless you are an Authorized Participant, you must hold VIPER Shares in a brokerage account. Thus, before converting conventional shares into VIPER Shares, you must have an existing, or open a new, brokerage account. To initiate a conversion of conventional shares into VIPER Shares, please contact your broker. Your broker may charge you a fee, over and above Vanguard's fee, to process a conversion request.

Converting conventional shares into VIPER Shares generally is accomplished as follows. First, after your broker notifies Vanguard of your request to convert, Vanguard will transfer your conventional shares from your account with Vanguard to the broker's omnibus account with Vanguard (an account maintained by the broker on behalf of all its customers who hold conventional Vanguard fund shares through the broker). At this point, Vanguard will no longer have any record of you as an investor; your ownership of conventional shares and VIPER Shares will be known only to your broker. Next, your broker will instruct Vanguard to convert the appropriate amount of conventional shares in its omnibus account into VIPER Shares of equivalent value. These shares will be held in an account at Vanguard in the name of DTC. (DTC will keep track of which VIPER Shares belong to your broker and your broker, in turn, will keep track of which VIPER Shares belong to you.) Because DTC is unable to handle fractional shares, only whole shares will be converted. For example, if you owned 300.250 conventional shares, and this was equivalent in value to 90.750 VIPER Shares, the DTC account would receive 90 VIPER Shares. Conventional shares worth 0.750 VIPER Shares (in this example, that would be 2.481 conventional shares) would remain in the broker's omnibus account with Vanguard. Your broker then could either (i) take certain internal actions necessary to credit your account with 0.750 VIPER Shares rather than 2.481 conventional shares, or (ii) redeem the 2.481 conventional shares at net asset value, in which case you would receive cash in lieu of those shares. If your broker chooses to redeem your conventional shares, you will realize a gain or loss on the redemption that must be reported on your tax return (unless you hold the shares in an IRA or other tax-deferred account). Please consult your broker for information on how it will handle the conversion process, including whether it will impose a fee to process a conversion.

The conversion process works differently if you opt to hold your VIPER Shares through an account at Vanguard Brokerage Services (VBS). If you convert your conventional shares to VIPER Shares through VBS, *all* conventional shares for which you request conversion will be converted into the equivalent of VIPER Shares. Because no fractional shares will have to be sold, the transaction will be 100% tax-free.

Here are some important points to keep in mind when converting conventional shares of a Vanguard fund into VIPER Shares:

- The conversion transaction is tax-free except, as applicable, to the limited extent described above.
- The conversion process can take anywhere from several days to several weeks, depending on your broker. Vanguard generally will process conversion requests, once received, on the same or next business day, although processing may take up to three days depending on when the conversion request is received.
- During the conversion process, you will remain fully invested in the fund's conventional shares, and your investment will increase or decrease in value in tandem with the net asset value of those shares.
- During the conversion process, you will be able to liquidate all or part of your investment by instructing Vanguard or your broker (depending on whether your shares are held in your own account or your broker's omnibus account) to redeem your conventional shares. After the conversion process is complete, you will be able to liquidate all or part of your investment by instructing your broker to sell your VIPER Shares.

Exchanges. VIPER Shares of one Fund may not be exchanged for VIPER Shares of another Fund.

PRECAUTIONARY NOTES

A precautionary note to retail investors. DTC or its nominee will be the registered owner of all outstanding VIPER Shares. Your ownership of VIPER Shares will be shown on the records of DTC and the DTC Participant broker through whom you hold the shares. Vanguard will not have any record of your ownership. Your account information will be maintained by your broker, who will provide you with account statements, confirmations of your purchases and sales of VIPER Shares, and tax information. Your broker also will be responsible for ensuring that you receive shareholder reports and other communications from the Fund whose VIPER Shares you own. You will receive other services (*e.g.*, dividend reinvestment and average cost information) only if your broker offers these services.

A precautionary note to purchasers of Creation Units: You should be aware of certain legal risks unique to investors purchasing Creation Units directly from the issuing fund.

Because new VIPER Shares may be issued on an ongoing basis, a "distribution" of VIPER shares could be occurring at any time. As a dealer, certain activities on your part could, depending on the circumstances, result in your being deemed a participant in the distribution, in a manner that could render you a statutory underwriter and subject you to the prospectus delivery and liability provisions of the Securities Act of 1933. For example, you could be deemed a statutory underwriter if you purchase Creation Units from an issuing fund, break them down into the constituent VIPER Shares, and sell those shares directly to customers, or if you choose to couple the creation of a supply of new VIPER Shares with an active selling effort involving solicitation of secondary market demand for VIPER Shares. Whether a person is an underwriter depends upon all of the facts and circumstances pertaining to that person's activities, and the examples mentioned here should not be considered a complete description of all the activities that could cause you to be deemed an underwriter.

Dealers who are not "underwriters," but are participating in a distribution (as opposed to engaging in ordinary secondary market transactions), and thus dealing with VIPER Shares as part of an "unsold allotment" within the meaning of Section 4(3)(C) of the Securities Act, will be unable to take advantage of the prospectus delivery exemption provided by Section 4(3) of the Securities Act.

A precautionary note to investment companies: For purposes of the Investment Company Act of 1940, VIPER Shares are issued by registered investment companies, and the acquisition of VIPER Shares by other investment companies is subject to the restrictions of Section 12(d)(1) of that Act.

A note on unusual circumstances: Vanguard can stop selling shares or postpone payment of redemption proceeds at times when the New York Stock Exchange is closed or under any emergency circumstances as determined by the U.S. Securities and Exchange Commission.

INVESTMENT POLICIES

Each of the funds issuing VIPER Shares reserves the right to substitute a different index for the index it currently tracks if the current index is discontinued, the fund's license with the sponsor of its target index is terminated, or for any other reason determined in good faith by the fund's board of trustees. In every such instance, the substitute index will measure the same general market (large- or small-cap, growth or value) as the current index.

Each fund may invest in foreign securities to the extent necessary to carry out its investment strategy of holding all, or a representative sample, of the stocks that comprise the index it tracks. It is not expected that a fund will invest more than 5% of its assets in foreign securities.

Although index funds, by their nature, tend to be tax-efficient investment vehicles, the funds generally are managed without regard to tax ramifications.

To track their target indexes as closely as possible, the funds attempt to remain fully invested (at least 95% of total assets) in stocks. To help stay fully invested, and to reduce transaction costs, the Funds may invest, to a limited extent, in stock futures and options contracts, warrants, convertible securities, and swap agreements, which are types of derivatives.

Losses (or gains) involving futures can sometimes be substantial—in part because a relatively small price movement in a futures contract may result in an immediate and substantial loss (or gain) for a fund. Similar risks exist for warrants (securities that permit their owners to purchase a specific number of stock shares at a predetermined price), convertible securities (securities that may be exchanged for another asset), and swap agreements (contracts in which each party agrees to make payments to the other based on the return of a specified index or asset).

For this reason, the funds will not use futures, options, warrants, convertible securities, or swap agreements for speculative purposes or as leveraged investments that magnify the gains or losses of an investment. A fund's obligation under futures contracts will not exceed 20% of that fund's total assets.

The reasons for which a fund will invest in futures and options are:

- To keep cash on hand to meet shareholder redemptions or other needs while simulating full investment in stocks.
- To reduce the fund's transaction costs or add value when these instruments are favorably priced.

VIPER Shares and Vanguard

The funds issuing VIPER shares are members of The Vanguard Group, a family of more than 35 investment companies with more than 100 funds holding assets worth more than $550 billion. All of the funds that are members of The Vanguard Group share in the expenses associated with business operations, such as personnel, office space, equipment, and advertising.

Vanguard also provides marketing services to the member funds. Although shareholders do not pay sales commissions or 12b-1 distribution fees, each fund pays its allocated share of The Vanguard Group's marketing costs.

Investment Adviser

The Vanguard Group (Vanguard), P.O. Box 2600, Valley Forge, PA 19482, founded in 1975, serves as adviser to the funds issuing VIPER Shares through its Quantitative Equity Group. As of December 31, 2000, Vanguard served as adviser for about $386.4 billion in assets. Vanguard manages the funds on an at-cost basis, subject to the control of the trustees and officers of the funds.

The funds have authorized Vanguard to choose brokers or dealers to handle the purchase and sale of securities for the funds, and to get the best available price and most favorable execution from these brokers with respect to all transactions. The funds may direct Vanguard to use a particular broker for certain transactions in exchange for commission rebates or research services provided to the funds.

Dividends, Capital Gains, and Taxes

FUND DISTRIBUTIONS

Each fund issuing VIPER Shares distributes to shareholders virtually all of its net income (interest and dividends, less expenses), as well as any capital gains realized from the sale of its holdings. Income dividends for the 500, Total Stock Market, Value, and Growth Index Funds generally are distributed in March, June, September, and December; income dividends, for the Small-Cap Index Fund generally are distributed in December. Capital gains distributions generally occur in December. In addition, the funds may occasionally be required to make supplemental dividend or capital gains distributions at some other time during the year.

DIVIDEND REINVESTMENT SERVICE

Brokers may make available to their customers who own VIPER Shares the DTC book-entry dividend reinvestment service. If this service is available and used, dividend distributions of both income and capital gains will automatically be reinvested in additional whole VIPER Shares of the same Fund. Without this service, investors would have to take their distributions in cash. To determine whether the dividend reinvestment service is available and whether there is a commission or other charge for using this service, please consult your broker.

BASIC TAX POINTS

Taxable investors should be aware of the following basic tax points:

- Distributions are taxable to you for federal income tax purposes whether or not you reinvest these amounts in additional VIPER Shares.
- Distributions declared in December—if paid to you by the end of January—are taxable for federal income tax purposes as if received in December.
- Any dividends and short-term capital gains that you receive are taxable to you as ordinary income for federal income tax purposes.
- Any distributions of net long-term capital gains are taxable to you as long-term capital gains for federal income tax purposes, no matter how long you've owned VIPER Shares.
- Capital gains distributions may vary considerably from year to year as a result of the funds' normal investment activities and cash flows.
- A sale of VIPER Shares is a taxable event. This means that you may have a capital gain to report as income, or a capital loss to report as a deduction, when you complete your federal income tax return.

Daily NAV Pricing

The *net asset value*, or NAV, of each fund's VIPER Shares is calculated each business day after the close of regular trading on the New York Stock Exchange (the NAV is not calculated on holidays or other days when the Exchange is closed). NAV per share is computed by adding up the fund's net assets attributable to VIPER Shares and then dividing by the number of VIPER Shares outstanding.

Remember: If you sell VIPER Shares on the secondary market, you will receive the market price, which may be higher or lower than NAV. You will receive NAV only if you redeem your VIPER Shares in Creation Unit blocks.

A Note on Pricing: In calculating a fund's NAV, the fund's investments will be priced at their *market value* when market quotations are readily available. When these quotations are not readily available, investments will be priced at their *fair value*, calculated according to procedures adopted by the funds' board of trustees.

The market price of a VIPER Share, for each issuing fund, can be found daily in the business section of most major newspapers in the listing of securities traded on the AMEX.

Note: This prospectus offers the funds' VIPER Shares, *not* the Investor Shares. Information for the Investor Shares is shown here because each of the fund's VIPER Shares are new. However, the two share classes are invested in the same portfolio of securities and will have the same financial performance except to the extent that their operating expenses differ.

Glossary of Investment Terms

Active Management
An investment approach that seeks to exceed the average returns of the financial markets. Active managers rely on research, market forecasts, and their own judgment and experience in selecting securities to buy and sell.

Capital Gains Distribution
Payment to fund shareholders of gains realized on securities that a fund has sold at a profit, minus any realized losses.

Common Stock
A security representing ownership rights in a corporation. A stockholder is entitled to share in the company's profits, some of which may be paid out as dividends.

Creation Unit
A large block of a specified number of VIPER shares, determined by the issuing fund. Depository Trust Company participants must buy VIPER shares in creation unit-size aggregations.

Dividend Income
Payment to shareholders of income from interest or dividends generated by a fund's investments.

Expense Ratio
The percentage of a fund's average net assets used to pay its expenses. The expense ratio includes management fees, administrative fees, and any 12b-1 distribution fees.

Growth Stock Fund
A mutual fund that emphasizes stocks of companies believed to have above-average prospects for growth. Reflecting market expectations for superior growth, these stocks typically have low dividend yields and above-average prices in relation to such measures as revenue, earnings, and book value.

Index
An unmanaged group of securities whose overall performance is used as a standard to measure investment performance.

Investment Adviser
An organization that makes the day-to-day decisions regarding a fund's investments.

Passive Management
A low-cost investment strategy in which a fund attempts to match—rather than outperform—a particular stock or bond market index. Also known as indexing.

Value Stock Fund
A mutual fund that emphasizes stocks of companies whose growth prospects are generally regarded as subpar by the market. Reflecting these market expectations, the prices of value stocks typically are below-average in comparison with such measures as earnings and book value, and these stocks typically pay above-average dividend yields.

VIPER Shares
Vanguard Index Participation Equity Receipts, which are a class of exchange-traded shares issued by certain Vanguard mutual funds that are bought and sold continuously throughout the day.

Volatility
The fluctuations in value of a fund or other security. The greater a fund's volatility, the wider the fluctuations between its high and low prices.

Yield
Income (interest or dividends) earned by an investment, expressed as a percentage of the investment's price.

APPENDIX B

INFORMATION ABOUT THE VIPER SHARE CLASS
OF VANGUARD INDEX FUNDS

Each Fund offers and issues VIPER Shares, at their net asset value, only in bundles of a specified number of VIPER Shares. These bundles are known as "Creation Units." To purchase or redeem a Creation Unit, you must be an Authorized Participant or you must do so through a broker that is an Authorized Participant. An Authorized Participant is a participant in the Depository Trust Company ("DTC") that has executed a Participant Agreement with Vanguard Marketing Corporation, the Funds' Distributor.

Each Fund issues Creation Units in kind, in exchange for a basket of stocks that are part of (or soon to be part of) its target index ("Deposit Securities"). Each Fund also redeems Creation Units in kind; an investor who tenders a Creation Unit will receive, as redemption proceeds, a basket of stocks that are part of the fund's portfolio holdings ("Redemption Securities"). The Deposit Securities and the Redemption Securities may not necessarily be the same. As part of any creation or redemption transaction, the investor will either pay or receive some cash in addition to the securities, as described more fully below. The Funds reserve the right to issue Creation Units for cash, rather than in kind, although they have no current intention of doing so.

EXCHANGE LISTING AND TRADING

VIPER Shares have been approved for listing on the American Stock Exchange ("AMEX") and will trade on the AMEX at market prices that may differ from net asset value.

There can be no assurance that, in the future, VIPER Shares will continue to meet all of the AMEX's listing requirements. The AMEX may, but is not required to, remove the VIPER Shares of any Fund from listing if: (1) following the initial 12-month period beginning upon the commencement of trading, there are fewer than 50 beneficial owners of the VIPER Shares of a Fund for 30 or more consecutive trading days; (2) the value of the target index tracked by the Fund is no longer calculated or available; or (3) such other event shall occur or condition exist that, in the opinion of the AMEX, makes further dealings on the AMEX inadvisable. The AMEX will also remove the VIPER Shares of a Fund from listing and trading upon termination of that Fund's VIPER Share class.

As with any stock traded on an exchange, purchases and sales of VIPER Shares will be subject to usual and customary brokerage commissions.

CONVERSIONS AND EXCHANGES

Owners of conventional shares issued by one of the Vanguard Index Funds may convert those shares into VIPER Shares of equivalent value of the same Fund. *Note: Investors who own conventional shares of a Vanguard fund through a 401(k) plan or other employer-sponsored retirement or benefit plan may not convert those shares into VIPER Shares.* Vanguard will impose a charge on conversion transactions and reserves the right, in the future, to limit or terminate the conversion privilege. VIPER Shares, whether acquired through a conversion or purchased in the secondary market, cannot be converted into shares of another class of the same Fund. In addition, VIPER Shares of one fund may not be exchanged for VIPER Shares of another fund.

Investors that are not Authorized Participants must hold VIPER Shares in a brokerage account. Thus, before converting conventional shares into VIPER Shares, an investor must have an existing, or open a new, brokerage account. To initiate a conversion of conventional shares into VIPER Shares, an investor must contact her broker. The broker may charge a fee, over and above Vanguard's fee, to process a conversion request.

Converting conventional shares into VIPER Shares generally is accomplished as follows. First, after the broker notifies Vanguard of an investor's request to convert, Vanguard will transfer conventional shares from the investor's account with Vanguard to the broker's omnibus account with Vanguard (an account maintained by the broker on behalf of all its customers who hold conventional Vanguard fund shares through the broker). At this point, Vanguard will no longer have any record of the investor; her ownership of conventional shares and VIPER Shares will be known only to her broker. Next, the broker will instruct Vanguard to convert the appropriate amount of conventional shares in its omnibus account into VIPER Shares of equivalent value. These shares will be held in an account at Vanguard in the name of DTC. (DTC will keep track of which VIPER Shares belong to the broker and the broker, in turn, will keep track of which VIPER Shares belong to its customers.) Because DTC is unable to handle fractional shares, only whole shares will be converted. For example, if the investor owned 300.250 conventional shares, and this was equivalent in value to 90.750 VIPER Shares, the DTC account would receive 90 VIPER Shares. Conventional shares worth 0.750 VIPER Shares (in this example, that would be 2.481 conventional shares) would remain in the broker's omnibus account with Vanguard. The broker then could either (i) take certain internal actions necessary to credit the investor's account with 0.750 VIPER Shares rather than 2.481 conventional shares, or (ii) redeem the 2.481 conventional shares at net asset value, in which case the investor would receive cash in lieu of those shares. If the broker chooses to redeem the conventional shares, the investor will realize a gain or loss on the redemption that must be reported on her tax return (unless she holds the shares in an IRA or other tax-deferred account). Investors should consult their brokers for information on how the brokers will handle the conversion process, including whether they will impose a fee to process a conversion.

The conversion process works differently if the investor opts to hold VIPER Shares through an account at Vanguard Brokerage Services (VBS). If the investor converts her conventional shares to VIPER Shares through VBS, *all* conventional shares for which she requests conversion will be converted into the equivalent amount of VIPER Shares. Because no fractional shares will have to be sold, the transaction will be 100% tax-free.

Here are some important points to keep in mind when converting conventional shares of a Vanguard fund into VIPER Shares:

- The conversion transaction is tax-free except, as applicable, to the limited extent described above.
- The conversion process can take anywhere from several days to several weeks, depending on the broker. Vanguard generally will process conversion requests, once received, on the same or next business day, although processing may take up to three days depending on when the conversion request is received.
- During the conversion process, the investor will remain fully invested in the fund's conventional shares, and her investment will increase or decrease in value in tandem with the net asset value of those shares.
- During the conversion process, the investor will be able to liquidate all or part of her investment by instructing Vanguard or her broker (depending on whether her shares are held in her own account or her broker's omnibus account) to redeem her conventional shares. After the conversion process is complete, the investor will be able to liquidate all or part of her investment by instructing her broker to sell her VIPER Shares.

BOOK ENTRY ONLY SYSTEM

VIPER Shares of each Fund are registered in the name of the DTC or its nominee, Cede & Co., and deposited with, or on behalf of, DTC. DTC is a limited-purpose trust company that was created to hold securities of its participants (the "DTC Participants") and to facilitate the clearance and settlement of securities transactions among the DTC Participants in such securities through electronic book-entry changes in accounts of the DTC Participants, thereby eliminating the need for physical movement of securities certificates. DTC Participants include securities brokers and dealers, banks, trust companies, clearing corporations and certain other organizations, some of whom (and/or their representatives) own DTC. More specifically, DTC is owned by a number of its DTC Participants and by the New York Stock Exchange ("NYSE"), the AMEX and the National Association of Securities Dealers ("NASD"). Access to the DTC system is also available to others such as banks, brokers, dealers, and trust companies that clear through or maintain a custodial relationship with a DTC Participant, either directly or indirectly (the "Indirect Participants").

Beneficial ownership of VIPER Shares is limited to DTC Participants, Indirect Participants, and persons holding interests through DTC Participants and Indirect Participants. Ownership of beneficial interests in VIPER Shares (owners of such beneficial interests are referred to herein as "Beneficial Owners") is shown on, and the transfer of ownership is effected only through, records maintained by DTC (with respect to DTC Participants) and on the records of DTC Participants (with respect to Indirect Participants and Beneficial Owners that are not DTC Participants). Beneficial Owners will receive from or through the DTC Participant a written confirmation relating to their purchase of VIPER Shares.

The Funds recognize DTC or its nominee as the record owner of all VIPER Shares for all purposes. Beneficial Owners of VIPER Shares are not entitled to have VIPER Shares registered in their names, and will not receive or be entitled to physical delivery of share certificates. Each Beneficial Owner must rely on the procedures of DTC and any DTC Participant and/or Indirect Participant through which such Beneficial Owner holds its interests, to exercise any rights of a holder of VIPER Shares.

Conveyance of all notices, statements and other communications to Beneficial Owners is effected as follows. Pursuant to the Depositary Agreement between the Trust and DTC, DTC is required to make available to the Trust upon request and for a fee to be charged to the Trust a listing of the VIPER Shares of each Fund held by each DTC Participant. The Trust shall inquire of each such DTC Participant as to the number of Beneficial Owners holding VIPER Shares, directly or indirectly, through such DTC Participant. The Trust shall provide each such DTC Participant with copies of such notice, statement, or other communication, in such form, number and at such place as such DTC Participant may reasonably request, in order that such notice, statement or communication may be transmitted by such DTC Participant, directly or indirectly, to such Beneficial Owners. In addition, the Trust shall pay to each such DTC Participant a fair and reasonable amount as reimbursement for the expenses attendant to such transmittal, all subject to applicable statutory and regulatory requirements.

Share distributions shall be made to DTC or its nominee as the registered holder of all VIPER Shares. DTC or its nominee, upon receipt of any such distributions, shall credit immediately DTC Participants' accounts with payments in amounts proportionate to their respective beneficial interests in VIPER Shares of each Fund as shown on the records of DTC or its nominee. Payments by DTC Participants to Indirect Participants and Beneficial Owners of VIPER Shares held through such DTC Participants will be governed by standing instructions and customary practices, as is now the case with securities held for the accounts of customers in bearer form or registered in a "street name," and will be the responsibility of such DTC Participants.

The Trust has no responsibility or liability for any aspects of the records relating to or notices to Beneficial Owners, or payments made on account of beneficial ownership interests in such VIPER Shares, or for maintaining, supervising or reviewing any records relating to such beneficial ownership interests, or for any other aspect of the relationship between DTC and the DTC Participants or the relationship between such DTC Participants and the Indirect Participants and Beneficial Owners owning through such DTC Participants.

DTC may determine to discontinue providing its service with respect to VIPER Shares at any time by giving reasonable notice to the Trust and discharging its responsibilities with resect thereto under applicable law. Under such circumstances, the Trust shall take action either to find a replacement for DTC to perform its functions at a comparable cost or, if such replacement is unavailable, to issue and deliver printed certificates representing ownership of VIPER Shares, unless the Trust makes other arrangements with respect thereto satisfactory to the AMEX (or such other exchange on which VIPER Shares may be listed).

PURCHASE AND ISSUANCE OF VIPER SHARES IN CREATION UNITS

Each Fund issues and sells VIPER Shares only in Creation Units on a continuous basis through the Distributor, without a sales load, at their net asset value next determined after receipt, on any Business Day, of an order in proper form. The Funds will not issue fractional Creation Units.

A "Business Day" with respect to each Fund is any day on which the NYSE is open for business. As of the date of the Prospectus, the NYSE observes the following holidays: New Year's Day, Martin Luther King, Jr. Day, Presidents' Day (Washington's Birthday), Good Friday, Memorial Day (observed), Independence Day, Labor Day, Thanksgiving Day, and Christmas Day.

Fund Deposit

The consideration for purchase of a Creation Unit from a Vanguard U.S. Stock Index Fund generally consists of the in-kind deposit of a designated portfolio of equity securities (the Deposit Securities) and an amount of cash (the "Cash Component") consisting of a Balancing Amount (described below) and a Transaction Fee (also described below). Together, the Deposit Securities and the Cash Component constitute the "Fund Deposit."

The "Balancing Amount" is an amount equal to the difference between the net asset value ("NAV") of a Creation Unit and the market value of the Deposit Securities (the "Deposit Amount"). It ensures that the NAV of a Fund Deposit (not including the Transaction Fee) is identical to the NAV of the Creation Unit it is used to purchase. If the Balancing Amount is a positive number (i.e., the NAV per Creation Unit exceeds the market value of the Deposit Securities), then that amount will be paid by the purchaser to the Fund in cash. If the Balancing Amount is a negative number (i.e., the NAV per Creation Unit is less than the market value of the Deposit Securities), then that amount will be paid by the Fund to the purchaser in cash (except as offset by the Transaction Fee, described below).

Vanguard, through the National Securities Clearing Corporation ("NSCC") (discussed below), makes available on each Business Day, immediately prior to the opening of business on the AMEX (currently 9:30 a.m., New York time), a list of the names and the required number of shares of each Deposit Security to be included in the current Fund Deposit (based on information at the end of the previous Business Day) for each Fund. Such Fund Deposit is applicable, subject to any adjustments as described below, in order to effect purchases of Creation Units of a given Fund until such time as the next-announced Fund Deposit composition is made available. Each Fund reserves the right to accept a non-conforming Fund Deposit.

The identity and number of shares of the Deposit Securities required for a Fund Deposit for each Fund changes as rebalancing adjustments and corporate action events are reflected from time to time by Vanguard with a view to the investment objective of the Fund. The composition of the Deposit Securities may also change in response to adjustments to the weighting or composition of the component stocks of the relevant target index. In addition, the Trust reserves the right to permit or require the substitution of an amount of cash -- i.e., a "cash in lieu" amount -- to be added to the Cash Component to replace any Deposit Security which may not be available in sufficient quantity for delivery or which may not be eligible for transfer through the Clearing Process (discussed below), or which may not be eligible for trading by an Authorized Participant (as defined below) or the investor for which an Authorized Participant is acting. Brokerage commissions incurred in connection with acquisition of Deposit Securities not eligible for transfer through the systems of DTC and hence not eligible for transfer through the Clearing Process (discussed below) will be an expense of the Fund. However, Vanguard may adjust the Transaction Fee (described below) to protect existing shareholders from this expense.

All questions as to the number of shares of each security in the Deposit Securities and the validity, form, eligibility, and acceptance for deposit of any securities to be delivered shall be determined by the issuing Fund, and the Fund's determination shall be final and binding.

Procedures For Purchasing Creation Units

To be eligible to place orders with the Distributor and to purchase Creation Units from a Fund, you must be an "Authorized Participant," i.e., a DTC Participant that has executed an agreement with the Trust's Distributor governing the purchase and redemption of Creation Units (the "Participant Agreement"). Investors who are not Authorized Participants must make appropriate arrangements with an Authorized Participant in order to purchase or redeem a Creation Unit. If your broker is not a DTC Participant or has not executed a Participant Agreement, it will have to place your order through an Authorized Participant, which may result in additional charges to you. For a current list of Authorized Participants, contact the Distributor.

An Authorized Participant may place an order to purchase (or redeem) Creation Units of VIPER Shares either (i) through the Continuous Net Settlement ("CNS") clearing processes of NSCC as such processes have been enhanced to effect purchases (and redemptions) of Creation Units, such processes being referred to herein as the "Clearing Process," or (ii) outside the Clearing Process. To purchase or redeem through the Clearing Process, an Authorized Participant must be a member of NSCC that is eligible to use the Continuous Net Settlement system. Purchases (and redemptions) of Creation Units cleared through the Clearing Process will be subject to a lower Transaction Fee than those cleared outside the Clearing Process.

To initiate a purchase order for a Creation Unit, whether through the Clearing Process ^ or outside the Clearing Process, an Authorized Participant must give notice to the Distributor. The order must be in proper form and must be received by the Distributor prior to the closing time of the regular trading session on the NYSE ("Closing Time") (ordinarily 4:00 p.m., New York time) to receive that day's NAV. The date on which an order to purchase (or redeem) Creation Units is placed is referred to as the "Transmittal Date." Orders must be transmitted by an Authorized Participant by a transmission method acceptable to the Distributor pursuant to procedures set forth in the Participation Agreement.

Purchase orders effected outside the Clearing Process are likely to require transmittal by the Authorized Participant earlier on the Transmittal Date than orders effected using the Clearing Process. Those persons placing orders outside the Clearing Process should ascertain the deadlines applicable to DTC and the Federal Reserve Bank wire system by contacting the operations department of the broker or depository institution effectuating such transfer of Deposit Securities and Cash Component.

Neither the Trust, the Distributor, nor any affiliated party will be liable to an investor who is unable to submit a purchase (or redemption) order by Closing Time, even if the problem is the responsibility of one of those parties (e.g., the Distributor's phone systems or fax machines were not operating properly.)

If you are not an Authorized Participant, you must place your purchase order with an Authorized Participant in a form acceptable to such Authorized Participant. In addition, the Authorized Participant may request that you make certain representations or enter into agreements with respect to the order, e.g., to provide for payments of cash when required. You should afford sufficient time to permit proper submission of the order by the Authorized Participant to the Distributor prior to Closing Time on the Transmittal Date.

Placement of Purchase Orders Using Clearing Process

For purchase orders placed through the Clearing Process, the Authorized Participant Agreement authorizes the Distributor to transmit through the Transfer Agent to NSCC, on behalf of an Authorized Participant, such trade instructions as are necessary to effect the Authorized Participant's purchase order. Pursuant to such trade instructions to NSCC, the Authorized Participant agrees to deliver the requisite Deposit Securities and the Cash Component to the Trust, together with such additional information as may be required by the Distributor.

An order to purchase Creation Units through the Clearing Process is deemed received on the Transmittal Date if (i) such order is received by the Distributor not later than the Closing Time on such Transmittal Date, and (ii) all other procedures set forth in the Participant Agreement are properly followed. Such order will be effected based on the NAV of the Fund next determined on that day. An order to purchase Creation Units through the Clearing Process made in proper form but received after Closing Time on the Transmittal Date will be deemed received on the next Business Day immediately following the Transmittal Date and will be effected at the NAV next determined on that day. The Deposit Securities and the Cash Component will be transferred by the third NSCC Business Day following the date on which the purchase request is deemed received.

Placement of Purchase Orders Outside Clearing Process

An Authorized Participant that wishes to place an order to purchase Creation Units outside the Clearing Process must state that it is not using the Clearing Process and that the purchase instead will be effected through a transfer of securities and cash directly through DTC. ^An order to purchase Creation Units outside the Clearing Process is deemed received by the Distributor on the Transmittal Date if (i) such order is received by the Distributor not later than the Closing Time on such Transmittal Date; and (ii) all other procedures set forth in the Participant Agreement are properly followed. If the Fund's custodian does not receive the Deposit Securities and Cash Component by the settlement date (T+3 unless otherwise agreed), the Fund shall be entitled to cancel the purchase order and/or charge the purchaser for any costs (including investment losses, attorney's fees, and interest) sustained by the Fund as a result of the late delivery or failure to deliver.

A Fund may issue Creation Units to a purchaser before receiving some or all of the Deposit Securities if the purchaser deposits, in addition to the available Deposit Securities and the Cash Component, cash totaling at least 115% of the market value of the undelivered Deposit Securities (the "Additional Cash Deposit"). The order shall be deemed to be received on the Business Day on which the order is placed provided that the order is placed in proper form prior to Closing Time on such date and federal funds in the appropriate amount are deposited with the Custodian by 11:00 a.m., New York time, the following Business Day. If the order is not placed in proper form by 4:00 p.m. or federal funds in the appropriate amount are not received by 11:00 a.m. the next Business Day, then the Fund may reject the order and the investor shall be liable to the Fund for losses, if any, resulting therefrom. Pending delivery of the missing Deposit Securities, the purchaser must deposit additional cash with the Fund to the extent necessary to maintain the Additional Cash Deposit in an amount at least equal to 115% of the daily marked-to-market value of the missing Deposit Securities. If the purchaser fails to deliver missing Deposit Securities by 1:00 p.m. on the third Business Day following the day on which the purchase order is deemed received by the Distributor, or fails to pay additional money to maintain the Additional Cash Deposit at 115% of the marked-to-market value of the missing securities within one Business Day following notification by the Distributor that such a payment is required, the Fund may use the cash on deposit to purchase the missing Deposit Securities. Authorized Participants will be liable to the Fund for the costs incurred by the Fund in connection with any such purchases. These costs will be deemed to include the amount by which the actual purchase price of the Deposit Securities exceeds the market value of such Deposit Securities on the day the purchase order was deemed received by the Distributor, plus the brokerage and related transaction costs associated with such purchases. The Fund will return any unused portion of the Additional Cash Deposit once all of the missing Deposit Securities have been properly received by the Custodian or purchased by the Fund. In addition, the Fund will be entitled to collect a transaction fee of $4,000 in all such cases. The delivery of Creation Units so purchased will occur no later than the third Business Day following the day on which the purchase order is deemed received by the Distributor.

Rejection of Purchase Orders

Each Fund reserves the absolute right to reject a purchase order transmitted to it by the Distributor. By way of example, and not limitation, a Fund will reject a purchase order if:

- the order is not in proper form;
- the investor(s), upon obtaining the VIPER Shares ordered, would own 80% or more of the total combined voting power of all classes of stock issued by the Fund;
- the Deposit Securities delivered are not as disseminated through the facilities of the AMEX for that date by the Custodian, as described above;
- acceptance of the Deposit Securities would have certain adverse tax consequences to the Fund;
- acceptance of the Fund Deposit would, in the opinion of counsel, be unlawful;
- acceptance of the Fund Deposit would otherwise, in the discretion of the Fund or Vanguard, have an adverse effect on the Fund or any of its shareholders; or
- circumstances outside the control of the Fund, the Transfer Agent, the Custodian, the Distributor, and Vanguard make it for all practical purposes impossible to process the order. Examples of such circumstances include acts of God; public service or utility problems such as fires, floods, extreme weather conditions, and power outages resulting in telephone, telecopy, and computer failures; market conditions or activities causing trading halts; systems failures involving computer or other information systems affecting the Trust, Vanguard, the Distributor, DTC, NSCC, or any other participant in the purchase process, and similar extraordinary events.

The Distributor shall notify the prospective purchaser of a Creation Unit, and/or the Authorized Participant acting on the purchaser's behalf, of its rejection of the purchaser's order. The Fund, the Transfer Agent, the Custodian, and the Distributor are under no duty, however, to give notification of any defects or irregularities in the delivery of a Fund Deposit, nor shall any of them incur any liability for the failure to give any such notification.

^Transaction Fee on Purchases of Creation Units

Each Fund imposes a transaction fee (payable to the Fund) to compensate the Fund for the transfer and other transaction costs associated with the issuance of Creation Units. For purchases effected through the Clearing Process, the Transaction Fee is $*, regardless of how many Creation Units are purchased. An additional charge of up to $* may be imposed for purchases effected outside the Clearing Process.

When a Fund permits a purchaser to substitute cash in lieu of depositing one or more Deposit Securities, the purchaser will be assessed an additional variable charge on the "cash in lieu" portion of its investment. The amount of this variable charge shall be established by the Fund in its sole discretion, but shall not be more than is reasonably needed to compensate the Fund for the brokerage costs associated with purchasing the relevant Deposit Securities and, if applicable, the estimated market impact costs of purchasing such securities.

REDEMPTION OF VIPER SHARES IN CREATION UNITS

VIPER Shares may be redeemed only in Creation Units; the Funds will not redeem VIPER Shares tendered in less than Creation Unit-size aggregations. Investors should expect to incur brokerage and other costs in connection with assembling a sufficient number of VIPER Shares to constitute a redeemable Creation Unit. There can be no assurance, however, that there will be sufficient liquidity in the public trading market at any time to permit assembly of a Creation Unit. Redemption requests in good order will receive the NAV next determined after the request is made.

An investor tendering a Creation Unit generally will receive redemption proceeds consisting of (1) a basket of Redemption Securities, plus (2) a "Cash Redemption Amount" equal to the difference between (x) the NAV of the Creation Unit being redeemed, as next determined after receipt of a request in proper form, and (y) the value of the Redemption Securities, less (3) a Redemption Transaction Fee (described below). If the Redemption Securities have a value greater then the NAV of a Creation Unit, the redeeming investor would pay the Cash Redemption Amount to the Fund, rather than receiving such amount from the Fund.

With respect to each Fund, Vanguard, through the NSCC, makes available immediately prior to the opening of business on the AMEX (currently 9:30 a.m., New York time) on each Business Day, the identity of the Redemption Securities that will be used (subject to possible amendment or correction) to satisfy redemption requests received in proper form (as defined below) on that day. The basket of Redemption Securities provided to an investor redeeming a Creation Unit may not be identical to the basket of Deposit Securities required of a investor purchasing a Creation Unit. If a Fund and a redeeming investor mutually agree, the Fund may provide such investor with a basket of Redemption Securities that differs from the composition of the redemption basket published through NSCC.

Transaction Fees on Redemptions of Creation Units

Each Fund imposes a transaction fee (payable to the Fund) to compensate the Fund for the transfer and other transaction costs associated with the redemption of Creation Units. For redemptions effected through the Clearing Process, the Transaction Fee is $*, regardless of how many Creation Units are redeemed. An additional charge of up to $* may be imposed for redemptions effected outside the Clearing Process.

When a Fund permits a redeeming investor to receive cash in lieu of one or more Redemption Securities, the investor will be assessed an additional variable charge on the "cash in lieu" portion of its redemption. The amount of this variable charge shall be established by the Fund in its sole discretion, but shall not be more than is reasonably needed to compensate the Fund for the brokerage costs associated with selling portfolio securities to raise the necessary cash and, if applicable, the estimated market impact costs of selling such securities.

Placement of Redemption Orders Using Clearing Process

An order to redeem Creation Units through the Clearing Process is deemed received on the Transmittal Date if (i) such order is received by the Distributor not later than the Closing Time on such Transmittal Date, and (ii) all other procedures set forth in the Participant Agreement are properly followed. Such order will be effected based on the NAV of the Fund next determined on that day. An order to redeem Creation Units through the Clearing Process made in proper form but received by the Fund after Closing Time on the Transmittal Date will be deemed received on the next Business Day immediately following the Transmittal Date and will be effected at the NAV next determined on that day. The Redemption Securities and the Cash Redemption Amount will be transferred by the third NSCC Business Day following the date on which the redemption request is deemed received.

Placement of Redemption Orders Outside Clearing Process

An Authorized Participant that wishes to place an order to redeem a Creation Unit outside the Clearing Process must state that it is not using the Clearing Process and that redemption instead will be effected through a transfer of VIPER Shares directly through DTC. An order to redeem a Creation Unit of a Fund outside the Clearing Process is deemed received on the Transmittal Date if (i) such order is received by the Fund's Transfer Agent prior to the Closing Time on such Transmittal Date; ^and (ii) all other procedures set forth in the Participant Agreement are properly followed. If the Fund's custodian does not receive the required number of VIPER Shares from the redeeming investor by the settlement date (T+3 unless otherwise agreed), the Fund shall be entitled to charge the redeeming investor for any costs (including investment losses, attorney's fees, and interest) sustained by the Fund as a result of the late delivery or failure to deliver.

After the Transfer Agent has deemed an order for redemption outside the Clearing Process received, the Transfer Agent will initiate procedures to transfer the Redemption Securities and the Cash Redemption Amount to the Authorized Participant on behalf of the redeeming Beneficial Owner by the third Business Day following the Transmittal Date on which such redemption order is deemed received by the Transfer Agent.

The calculation of the value of the Redemption Securities and the Cash Redemption Amount to be delivered upon redemption will be made by the Custodian according to the procedures set forth under "Calculation of Net Asset Value," computed on the Business Day on which a redemption order is deemed received by the Transfer Agent. Therefore, if a redemption order in proper form is submitted to the Transfer Agent by an Authorized Participant prior to the Closing Time on the Transmittal Date, ^ then the value of the Redemption Securities and the Cash Redemption Amount will be determined by the Custodian on such Transmittal Date. ^

Each Fund reserves the right, in its sole discretion, to require or permit a redeeming investor to receive its redemption proceeds in cash. In such cases, the investor would receive a cash payment equal to the net asset value of its VIPER Shares based on the NAV of the Fund's VIPER Shares next determined after the redemption request is received in proper form (minus a transaction fee, including a charge for cash redemptions, described above).

If a redeeming investor (or an Authorized Participant through which it is acting) is subject to a legal restriction with respect to a particular stock included in the basket of Redemption Securities, such investor may be paid an equivalent amount of cash in lieu of the stock. In addition, each Fund reserves the right to redeem Creation Units partially for cash to the extent that the Fund could not lawfully deliver one or more Redemption Securities or could not do so without first registering such securities under federal or state law.

What is claimed is:

1. A computer program product for administering a single investment company, the computer program product comprising a computer-readable medium encoded with computer-executable instructions for performing a method comprising:
   (a) the single investment company issuing one or more classes of shares that are bought from and redeemed with the single investment company at a net asset value;
   (b) the single investment company issuing one or more classes of shares that are listed for trading on a securities exchange and that are bought and sold at negotiated market prices; and
   (c) maintaining in one or more computers, account data of the outstanding shares, wherein an owner of any share of any share class has an undivided interest in the single investment company.

2. The computer program product of claim 1 wherein shares that are bought and sold at negotiated market prices are exchange-traded shares, and wherein the computer-executable instructions perform a method further comprising:
   (d) an investor purchasing or selling the exchange-traded shares on the secondary market though a broker; and
   (e) updating account data of the investor in the one or more computers to reflect the new number of shares held by the investor.

3. The computer program product of claim 2 wherein the computer-executable instructions perform a method further comprising:
   (f) the broker purchasing or selling the exchange-traded shares from or to a market maker on behalf of the investor to fulfill the investor's purchase or sell order.

4. The computer program product of claim 1 wherein there are a plurality of shareholders and the account data includes an account for each shareholder.

5. The computer program product of claim 1 wherein the computer-executable instructions perform a method further comprising:
   (d) a shareholder acquiring the exchange-traded shares by requesting conversion of a designated number or dollar value of shares belonging to the one or more classes of shares that are bought from and redeemed with the single investment company at a net asset value for a monetarily equivalent number of shares of the one or more classes of shares that are exchange-traded shares of the single investment company; and
   (e) updating the account data in the one or more computers to reflect the new number of shares of each type.

6. The computer program product of claim 1 wherein the computer-executable instructions perform a method further comprising:
   (d) an authorized participant purchasing the exchange-traded shares directly from the single investment company in exchange for a basket of securities of generally equivalent monetary value, wherein a direct purchase requires a purchase of a predetermined number of exchange-traded shares; and
   (e) updating the account data in the one or more computers to include the newly purchased shares.

7. The computer program product of claim 1 wherein the single investment company is an open-end fund.

8. The computer program product of claim 1 wherein the single investment company is a closed-end fund.

9. The computer program product of claim 1 wherein the single investment company is a unit investment trust.

10. The computer program product of claim 1 wherein the exchange-traded shares are publicly listed and traded.

11. The computer program product of claim 1 wherein the single investment company has an investment objective of tracking a specific benchmark index of securities.

12. The computer program product of claim 1 wherein the single investment company is actively managed by an investment advisor.

* * * * *